(12) United States Patent
Holguin et al.

(10) Patent No.: US 12,045,419 B2
(45) Date of Patent: Jul. 23, 2024

(54) USER INTERFACE MODIFICATION SYSTEMS AND RELATED METHODS

(71) Applicant: Promethean Limited, Blackburn (GB)

(72) Inventors: Antonio Holguin, Tacoma, WA (US); Neha Tembey, Seattle, WA (US); Thomas Ham, Peraluma, CA (US)

(73) Assignee: Promethean Limited, Blackburn (GB)

( * ) Notice: Subject to any disclaimer, the term of this patent is extended or adjusted under 35 U.S.C. 154(b) by 0 days.

(21) Appl. No.: 18/190,211

(22) Filed: Mar. 27, 2023

(65) Prior Publication Data

US 2023/0305661 A1 Sep. 28, 2023

Related U.S. Application Data

(60) Provisional application No. 63/324,592, filed on Mar. 28, 2022.

(51) Int. Cl.
*G06F 3/0482* (2013.01)
*G06F 3/041* (2006.01)
(Continued)

(52) U.S. Cl.
CPC ........ *G06F 3/04186* (2019.05); *G06F 3/0482* (2013.01); *G06F 3/04845* (2013.01);
(Continued)

(58) Field of Classification Search
CPC .............. G06F 3/04186; G06F 3/0482; G06F 3/04845; G06F 3/0488; G06F 3/043; G06F 3/044; G06F 3/045
See application file for complete search history.

(56) References Cited

U.S. PATENT DOCUMENTS 5,731,801 A 3/1998 Fukuzaki
6,142,910 A 11/2000 Heuvelman
(Continued)

FOREIGN PATENT DOCUMENTS

JP 08006705 1/1996
JP 2000089884 3/2000
(Continued)

OTHER PUBLICATIONS

International Search Report, dated Jul. 11, 2023, from corresponding International Application No. PCT/IB2023/053020.
(Continued)

*Primary Examiner* — Rodney Amadiz
(74) *Attorney, Agent, or Firm* — Thomas Horstemeyer, LLP

(57) ABSTRACT

As described herein, certain embodiments provide improvements to graphical user interface generation by including a specific structure in a generated user interface that provides a specific function derived from that specific structure. For example, in various embodiments, a generated user interface comprises a plurality of interface elements that correspond to a particular menu or interface structure. In other embodiments, the system may modify (e.g., on-the-fly) a structural position of one or more interface elements to improve the efficiency of a user using the display device by modifying the structure to improve the accessibility of each of the interface elements. As such, various embodiments described herein are directed to a specific improved method for displaying, accessing, and selecting elements of the generated user interfaces, particularly when the generated user interfaces include a structure defined by user input data and other data.

20 Claims, 18 Drawing Sheets

(51) Int. Cl.
  *G06F 3/04845*  (2022.01)
  *G06F 3/0488*   (2022.01)
  *G06F 3/043*        (2006.01)
  *G06F 3/044*        (2006.01)
  *G06F 3/045*        (2006.01)

(52) U.S. Cl.
  CPC ............ *G06F 3/0488* (2013.01); *G06F 3/043* (2013.01); *G06F 3/044* (2013.01); *G06F 3/045* (2013.01)

(56) References Cited

U.S. PATENT DOCUMENTS

| | | | |
|---|---|---|---|
| 8,300,023 | B2 | 10/2012 | Forutanpour et al. |
| 8,591,039 | B2 | 11/2013 | Morrison et al. |
| 8,659,658 | B2 | 2/2014 | Vassigh et al. |
| 8,963,849 | B2 | 2/2015 | Shimotani et al. |
| 8,982,072 | B2 | 3/2015 | Sim et al. |
| 9,230,386 | B2 | 1/2016 | Roh et al. |
| 9,268,405 | B2 | 2/2016 | Bailey et al. |
| 9,268,482 | B2 | 2/2016 | Wei et al. |
| 9,542,087 | B2 | 1/2017 | Arai |
| 9,740,367 | B2 | 8/2017 | Lin et al. |
| 9,746,919 | B2 | 8/2017 | Seta et al. |
| 10,852,901 | B2 | 12/2020 | Healy |
| 11,231,785 | B2 | 1/2022 | Cho et al. |
| 2008/0192024 | A1 | 8/2008 | Mita |
| 2010/0188342 | A1 | 7/2010 | Dunn |
| 2011/0148926 | A1 | 6/2011 | Koo et al. |
| 2011/0164063 | A1* | 7/2011 | Shimotani ........... G06F 3/04886 345/676 |
| 2012/0113151 | A1 | 5/2012 | Nakano |
| 2014/0204063 | A1 | 7/2014 | Kaida |
| 2016/0070466 | A1 | 3/2016 | Chaudhri et al. |
| 2016/0189340 | A1 | 6/2016 | Cudak et al. |
| 2016/0291747 | A1 | 10/2016 | Fischer |
| 2017/0003854 | A1* | 1/2017 | Lin ........................ G06F 3/0482 |
| 2017/0269771 | A1 | 9/2017 | Nam et al. |
| 2018/0181245 | A1* | 6/2018 | Beck .................... G06F 3/04883 |
| 2018/0253221 | A1* | 9/2018 | Cho ....................... G06F 3/0482 |

FOREIGN PATENT DOCUMENTS

| | | |
|---|---|---|
| JP | 2001117684 | 4/2001 |
| KR | 20160069909 | 6/2016 |
| WO | 2020/154283 | 7/2020 |

OTHER PUBLICATIONS

Written Opinion of the International Searching Authority, dated Jul. 11, 2023, from corresponding International Application No. PCT/IB2023/053020.

Final Office Action, dated Jan. 3, 2020, from corresponding U.S. Appl. No. 16/253,136.

International Search Report, dated Apr. 14, 2020, from corresponding International Application No. PCT/US2020/014394.

Notice of Allowance, dated Jul. 29, 2020, from corresponding U.S. Appl. No. 16/253,136.

Office Action, dated Jul. 9, 2019, from corresponding U.S. Appl. No. 16/253,136.

Restriction Requirement, dated Apr. 1, 2019, from corresponding U.S. Appl. No. 16/253,136.

Written Opinion of the International Searching Authority, dated Apr. 14, 2020, from corresponding International Application No. PCT/US2020/014394.

* cited by examiner

USER INTERFACE MODIFICATION SYSTEMS AND RELATED METHODS

CROSS-REFERENCE TO RELATED APPLICATIONS

This application claims the benefit of U.S. Provisional Patent Application Ser. No. 63/324,592, filed Mar. 28, 2022, the entire disclosure of which is hereby incorporated herein by reference in its entirety.

TECHNICAL FIELD

This disclosure relates generally to data processing systems where a user's interaction with a computer system is used to control the presentation of display data, such as user interface elements. More specifically, and not by way of limitation, the disclosure relates to customized user interface generation and modification of user interfaces within a computing system.

BACKGROUND

Using a particularly large display screen for demonstration and/or teaching purposes can lead to physical fatigue as a result of the size of the display screen. In particular, it can be technically challenging to optimize the utility and functionality of large-scale display screen devices through the use of user interfaces. Accordingly, there is a need for systems and methods that address these difficulties in addition to other deficiencies found in prior art systems.

SUMMARY

An interactive touch-enabled display device, in various embodiments, comprises a display device having at least one processor, a display screen, and an interactive touch screen display input. In some aspects, the at least one processor is configured for: (1) receiving input location data from the interactive touch screen display input; (2) determining, based on the input location data, a position of an input location zone defining one or more user inputs on the interactive touch-enabled display device; (3) determining, based on the input location zone, a relative position of the input location zone and a user interface displayed on the display screen; and (4) modifying a position of the user interface from an initial position to a second position disposed laterally between the initial position and the input location zone. In various aspects, the at least one processor is further configured for: (1) receiving additional input location data from the interactive touch screen display input; (2) determining that the additional input location data includes additional user inputs on the interactive touch-enabled display device within the input location zone; and (3) responsive to determining that the additional input location data includes the additional user inputs on the interactive touch-enabled display device within the input location zone, modifying the second position to a third position that is disposed laterally between the second position and the input location zone.

In particular aspects, the at least one processor is further configured for: (1) receiving second additional input location data from the interactive touch screen display input; (2) determining, based on the second additional input location data, that the second additional input location data includes an indication that at least a particular amount of time has passed from a latest user input on the interactive touch-enabled display device; and (3) responsive to determining that at least the particular amount of time has passed from the latest user input on the interactive touch-enabled display device, modifying the third position to a fourth position that is laterally disposed between the third position and the initial position. In some aspects, the at least one processor is further configured for: (1) receiving third additional input location data from the interactive touch screen display input; (2) determining, based on the third additional input location data, that the third additional input location data includes an indication that at least the p articular amount of time has passed from the latest user input on the interactive touch-enabled display device; and (3) responsive to determining that at least the particular amount of time has passed from the latest user input on the interactive touch-enabled display device, modifying the third position to the initial position.

In some aspects, the user interface comprises a plurality of user interface elements and modifying the position of the user interface comprises modifying a relative position of the plurality of user interface elements within the user interface. In other aspects, modifying the relative position of the plurality of user interface elements within the user interface comprises at least one of modifying an arrangement of at least one of the user interface elements of the plurality of user interface elements within the user interface or modifying a lateral position of the at least one of the plurality of user interface elements within the user interface. In various aspects, modifying the position of the user interface from the initial position to the second position disposed laterally between the initial position and the input location zone comprises: (1) defining a user interface repositioning vector that extends between the user interface and the input location zone; and (2) translating the user interface along the user interface repositioning vector from the initial position to the second position that is disposed on the user interface repositioning vector. In some aspects, the at least one processor is further configured for: (1) determining, based on the input location data, that the input location zone comprises a primary input location zone and a secondary input location zone; and (2) in response to determining that the input location zone comprises the primary input location zone and the secondary input location zone, duplicating the user interface into a first duplicate user interface and a second duplicate user interface.

In some embodiments, the at least one processor is further configured for: (1) positioning the first duplicate user interface adjacent the primary input location zone; and (2) positioning the second duplicate user interface adjacent the secondary input location zone.

An interactive touch screen display device, according to various aspects, comprises a display device having at least one processor, a display screen, and an interactive touch screen display input. In various aspects, the at least one processor is configured for: (1) receiving input data via the interactive touch screen display input; (2) determining a relative position of one or more inputs on the interactive touch screen display input defined by the by the input data with respect to a first position of at least one interface element on the display screen; (3) configuring, based on the input data, a user interface that includes a modified lateral position of the at least one interface element on the display screen by adjusting the lateral position of the at least one interface element relative to the first position of the at least one interface element; and (4) causing the interactive touch screen display to display the user interface including the modified lateral position of the at least one interface element on the display screen. In some embodiments, the at least one interface element is a first interface element of a plurality of interface elements, and each of the plurality of interface elements are disposed in a line that is parallel to an upper and lower edge of the interactive touch screen display device.

In particular aspects, the first position is a center point of the interactive touch screen display device. In other aspects, the input data comprises one or more user inputs on a menu defined by the plurality of interface elements. In some aspects: (1) the menu comprises the plurality of interface elements; (2) the menu extends from a left edge of the interactive touch screen display device to a right edge of the interactive touch screen display device; and (3) the plurality of interface elements are distributed in the line such that the plurality of interface elements extend across a portion of the menu. In particular embodiments, the input data comprises one or more user inputs on the menu on a portion of the menu that do not include the plurality of interface elements. In various embodiments, determining the relative position of one or more inputs on the interactive touch screen display input defined by the by the input data with respect to the first position of at least one interface element on the display screen comprises determining that at least a threshold number of the one or more inputs occurred in a vertical segment of the display screen. In still other embodiments, configuring the user interface based on the input data comprises biasing the at least one interface element from the first position to a second positioned defined by the vertical segment of the display screen based on the threshold number of the one or more inputs.

In some aspects, the at least one processor is further configured for: (1) determining a lateral location of a user of the interactive touch screen display device relative to the interactive touch screen display device; and (2) adjusting the modified lateral position based on the lateral location of the user. In some aspects, the at least one processor is further configured for: (1) accessing profile data for the user; (2) determining a dominant hand of the user from the profile data; and (3) adjusting the modified lateral position based on the dominant hand.

A method, according to various embodiments, comprises: (1) receiving, by computing hardware, input location data received via an interactive touch-enabled display device; (2) defining, by the computing hardware, a primary input location zone based on the input location data; (3) identifying, by the computing hardware, a first user interface displayed on the interactive touch-enabled display device in a first position; and (4) modifying, by the computing hardware, the first position to a second position that is disposed between the first position and the primary input location zone. In some aspects, the method further comprise: (1) receiving, by the computing hardware, additional input location data; (2) determining, by the computing hardware based on the additional input location data, that the additional input location data includes additional user inputs on the interactive touch-enabled display device within the primary input location zone; and (2) responsive to determining that the additional input location data includes the additional user inputs on the interactive touch-enabled display device within the primary input location zone, modifying, by the computing hardware, the second position to a third position that is disposed between the second position and the primary input location zone.

In still other embodiments, the method comprises: (1) receiving, by the computing hardware, second additional input location data; (2) determining, by the computing hardware based on the second additional input location data, that the second additional input location data includes an indication that at least a particular amount of time has passed from a latest user input on the interactive touch-enabled display device; and (3) responsive to determining that at least the particular amount of time has passed from the latest user input on the interactive touch-enabled display device, modifying, by the computing hardware, the third position to a fourth position that is disposed between the third position and the first position.

BRIEF DESCRIPTION OF THE DRAWINGS

Various embodiments of an interactive display system are described below. In the course of this description, reference will be made to the accompanying drawings, which are not necessarily drawn to scale, and wherein.

DETAILED DESCRIPTION

Figure 1:
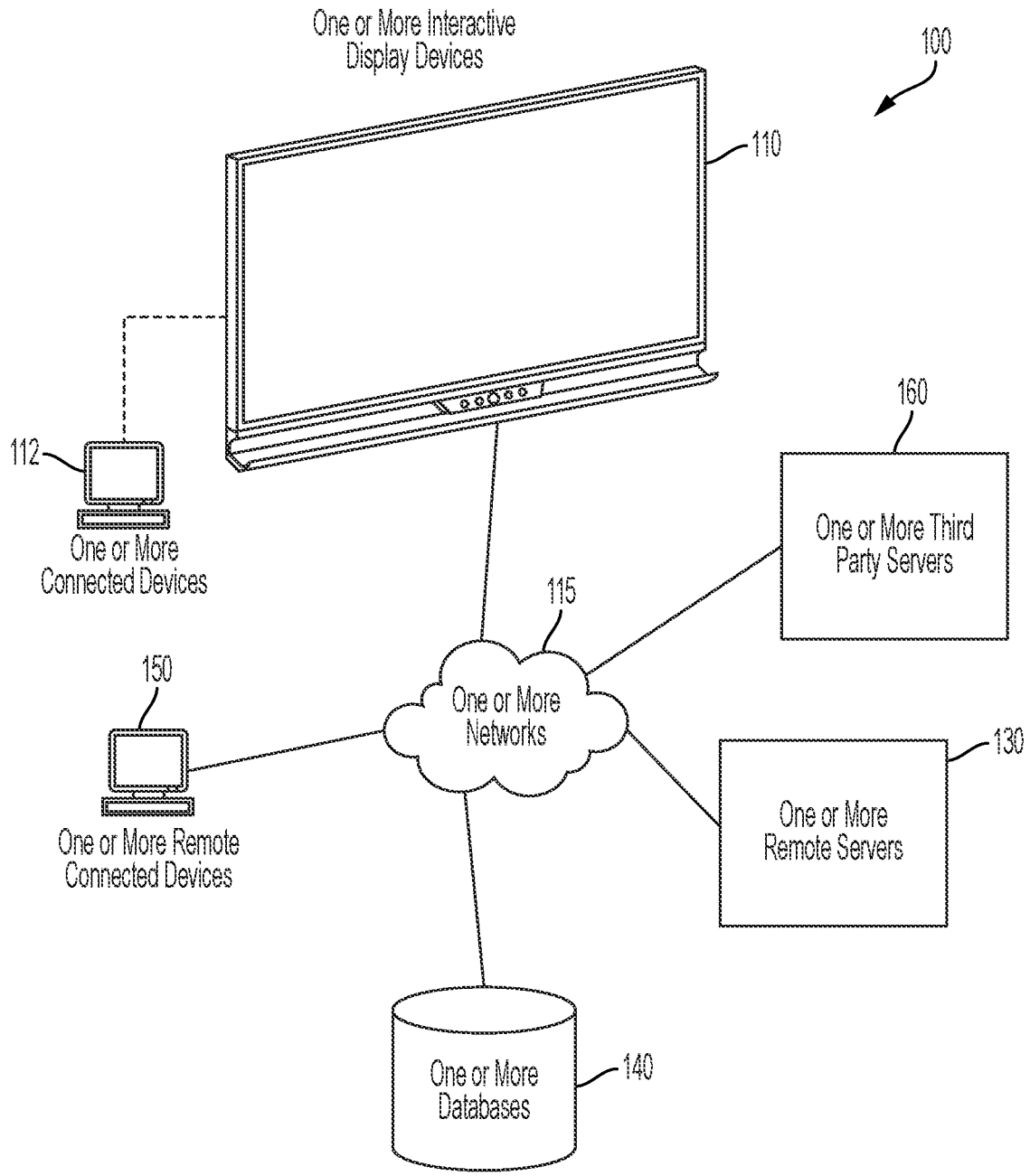
FIG. 1 is a block diagram of an interactive display system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

An interactive display and configuration system 100, according to particular embodiments, comprises: (1) one or more interactive display devices 110, which may, for example, include any suitable interactive display device (e.g., such as any suitable Promethean ActivPanel display); and (2) one or more connected computing devices 112 operatively coupled to the one or more interactive display devices 110 (e.g., via any suitable wireless and/or wired connection). In some embodiments, the one or more interactive display devices 110 are configured to display data (e.g., video data, image data, etc.) from the one or more connected computing devices 112 on at least a portion of a display screen of the one or more interactive display devices 110.

In various embodiments, the interactive display and configuration system 100 may be further configured to reduce user fatigue (e.g., as a result of having to reach for different portions of the interactive display, step back to see different portions of the interactive display, crane the user's neck to see different portions of the display, etc.). The system may, for example, be configured to modify and/or adjust one or more user interfaces on the interactive display device based at least in part on one or more recent user input locations on the interactive display system 110. The system may, for example, be configured to modify and/or adjust a position, size, etc. of one or more user interfaces based at least in part on the user's use of the interactive display device (e.g., in addition to one or more user characteristic). In various embodiments, the system may be configured to modify a position of one or more menu items in an interactive menu. In some embodiments, the system may be further configured to cause user interfaces to spawn (e.g.) pop out based at least in part on a location of an input provided by the user (e.g., such that the system causes the user interface to appear in a location on the display screen such that the user may see the user interface and be able to interact with the user interface substantially without moving (e.g., substantially without having to crane their neck, reposition themselves adjacent the interactive display device, etc.).

In some embodiments, the system may be configured to adjust user interface features with which a user may interact toward a particular side of the interactive display, for example, to make the user interface features easier to reach for users. As discussed herein, particular embodiments of an interactive display device may include a particularly large screen which may, for example, have portions of its display that are difficult to reach due to those portions' height and/or width relative to a support surface of the user (e.g., the floor).

In particular embodiments, the system is configured to modify and/or adjust user interface positioning, size, etc. based on, for example: (1) user preference data (e.g., which the system may receive and/or determine from a user's profile when the user logs into or otherwise provides such preference data to the interactive display device using any technique described herein); (2) user input locations on the display; (3) user physical characteristics (e.g., handedness, etc.).

In still other embodiments, the system is configured to: (1) track user touches (e.g., inputs) in one or more particular areas of the interactive display device (e.g., one or more areas adjacent a particular side of the interactive display); (2) automatically modify a current location (e.g., default location) of one or more user interfaces based at least in part on detecting user input on a particular portion of the display (e.g., adjacent a left side of the display, adjacent a right side of the display, adjacent a left or right portion of a menu containing the user interface feature to be moved, etc.). This may, for example, enable the system to reduce user fatigue by modifying user interface positioning (e.g., by adjusting the position toward a side of the interactive display on which the user is primarily providing input or otherwise interacting). This may be particularly useful in the case of large-scale, interactive touch-enabled display devices. As may be understood in light of this disclosure, large-scale touch-enabled display panels may provide computing functionality in addition to traditional blackboard or whiteboard functionality in a desired environment (e.g., classroom, meeting room, etc.). Touch-enabled display panels on this scale may provide access to computing functionality (e.g., software applications, user-selectable objects, settings, etc.) via one or more user interfaces on the display). In particular aspects, the usability of such a large scale device may be limited when particular computing functionality is provided via user interfaces that may be poorly positioned on the display with respect to the manner in which a user is using the touch-enabled display device.

As described herein, certain embodiments provide improvements in graphics processing by automatically applying various rules of a particular type, such as user interface positioning constraints, to control the manner in which computing devices dynamically generate user interfaces for presentation on an interactive display device (e.g., and/or dynamically modify a current position, size, or configuration of one or more user interfaces or interface elements. For example, these embodiments automatically compute and configure a position of user interfaces elements for accessing particular user interface elements on a large scale display device. Examples of these position configuration parameters could include, for example, lateral position determination data for various user interface elements or sets of user interface elements. This process reduces or eliminates the need to rely on user inputs at a default interface location (e.g., moving and navigating to desired input elements, accessing the feature provided by the element, interacting with the feature in a new location following selection of the feature, etc.) to manually access interface elements in a user-accessible portion of a large-scale display screen.

The automated application of these rules is facilitated by and specifically improve user interface generation. By contrast, conventional techniques for generating user interfaces elements require generation of user interfaces that include default interface placement, regardless of screen size, user positioning relative to the screen, what portion of the display screen the user is currently providing input via (e.g., as in via a whiteboard application on a large-scale touch-enabled device, etc.) Thus, embodiments described herein improve computer-implemented processes that are unique to generating and modifying user interfaces, thereby providing a more suitable solution for automating tasks previously performed by humans or previously resulting in device users having to physically move relative to a device rather than accessing interface elements (e.g., and the interface element associated computing functionality) intuitively.

Furthermore, certain embodiments provide improvements to computing systems used for generating and/or modifying user interfaces for accessing interface elements by, for example, reducing cumbersome or time-consuming processes for locating an interface element on the display device, physically repositioning oneself to access the interface element, and selecting the interface element at a default, often inconvenient location. These problems can be addressed by various user interface features described herein. For instance, a structural position of interface elements in the context of a display device can enable a user to select the element by dynamically modifying a lateral position of the element with respect to the display device based on user input data and user positioning and other preference data. Thus, the structure and associated functionality of the interface features described herein can provide improvements in the field of user interface generation and display. As described more fully herein, modifying of user interface elements may include, for example: (1) dynamically modifying a position of one or more user interface elements as a user interacts with the touch-enabled display device (e.g., large-scale touch-screen display device); (2) dynamically modifying a size of one or more user interface elements as a user interacts with the touch-enabled display device; (3) dynamically modifying an arrangement of user interface elements within a particular user interface as a user interacts with the touch-enabled display device; (4) etc.

As described herein, certain embodiments provide improvements to graphical user interface generation by including a specific structure in a generated user interface that provides a specific function derived from that specific structure. For example, in various embodiments, a generated user interface comprises a plurality of interface elements that correspond to a particular menu or interface structure. In other embodiments, the system may modify (e.g., on-the fly) a structural position of one or more interface elements to improve the efficiency of a user using the display device by modifying the structure to improve the accessibility of each of the interface elements. As such, various embodiments described herein are directed to a specific improved method for displaying, accessing, and selecting elements of the generated user interfaces, particularly when the generated user interfaces include a structure defined by user input data and other data.

Other problems can be addressed by various user interface features described herein. For instance, a user interface configuration system can include a plurality of interface elements, the position of which is determined from and/or modified based on user input data that facilitates the automation of the generation, structuring, and instant position of the user interfaces. Thus, the structure and associated functionality of the interface features described herein can provide improvements in the field of user interface generation, input, presentation, and modification.

Exemplary Technical Platforms

As will be appreciated by one skilled in the relevant field, the present invention may be, for example, embodied as a computer system, a method (e.g., a computer-implemented method, computer-implemented data processing method, etc.), or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium (e.g., a nontransitory computer-readable medium) having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods (e.g., computer-implemented methods), apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of an interactive display and configuration system 100 according to particular embodiments. As may be understood from this figure, an interactive display and configuration system 100, according to a first embodiment, comprises: (1) one or more interactive display devices 110, which may, for example, include any suitable interactive display device (e.g., such as any suitable Promethean ActivPanel display); and (2) one or more connected computing devices 112 operatively coupled to the one or more interactive display devices 110 (e.g., via any suitable wireless and/or wired connection). In some embodiments, the one or more interactive display devices 110 are configured to display data (e.g., video data, image data, etc.) from the one or more connected computing devices 112 on at least a portion of a display screen of the one or more interactive display devices 110. In particular embodiments, the one or more interactive display devices 110 are configured to pass one or more inputs received at the one or more interactive display devices 110 to the one or more connected computing devices 112.

In various embodiments, the one or more interactive display devices 110 may be operatively coupled (e.g., connected) to the one or more connected computing devices 112 in any suitable manner using any suitable connection type (e.g., wired and/or wireless connection type).

In various embodiments of an interactive display and configuration system 100, the one or more interactive display devices 110 comprises one or more touch screen display devices, which may, for example, comprise any suitable touch screen device configured to receive input via contact on the display device (e.g., via a user's finger or other body part, via a stylus or other pen-like device, etc.). For example, in various embodiments, the one or more interactive display devices 110 comprise one or more resistive touch screen displays (e.g., one or more 5-wire resistive touch screen displays), one or more surface capacitive touch screen displays, one or more projected capacitive touch screen displays, one or more surface acoustic wave touch screen displays, one or more infrared touch screen displays (e.g., which may, for example include one or more touch overlays at least partially embedded in a bezel of the one or more interactive display devices 110), or any other suitable touch screen display. In particular embodiments, the one or more interactive display devices 110 comprise one or more processors and memory. In such embodiments, the one or more interactive display devices 110 may comprise stand-alone computing devices such as handheld computing device (e.g., tablet computers or smartphones), wall mounted display devices (e.g., such as touch-enabled computerized LED and/or LCD displays), etc. As may be understood form this disclosure, a touch-screen display device may be relatively large such that a user of the device is not able to reach each portion of the display screen/touchscreen while stationary in front of it.

In particular embodiments, the one or more interactive display devices 110 are configured to detect a plurality of simultaneous inputs (e.g., from a plurality of users). In various embodiments, the one or more interactive display devices 110 are configured to enable a user to interact with one or more displayed images as the user would interact with any other computing display device (e.g., by drawing on the one or more projected images), etc. In still other embodiments, the one or more interactive display devices 110 include one or more computing components (e.g., one or more processors and memory) such that the one or more interactive display devices 110 embodies a stand-alone computing device.

In particular embodiments, the one or more interactive display devices 110 are configured to run software locally on the one or more interactive display devices 110. For example, in one embodiment of an interactive display and configuration system 100, the one or more interactive display devices 110 may store software applications on local memory associated with the one or more interactive display devices 110, execute software instructions from the interactive overlay software application using one or more local processors associated with the one or more interactive display devices 110, detect inputs locally using any suitable input detection technique for the one or more interactive display devices 110, etc. In particular embodiments, the software applications native to the one or more interactive display devices may include, for example, any suitable software such as: (1) one or more word processing applications; (2) one or more pieces of annotation software; (3) one or more video applications; (4) one or more whiteboard simulating software applications; and/or (5) any other suitable software application.

In particular embodiments, the one or more connected computing devices 112 may include any suitable connected computing device such as, for example, one or more laptop computers, one or more tablet computers, one or more Chromeboxes™, one or more Amazon™ Fire TV devices, one or more Apple™ TV devices, one or more gaming systems (e.g., one or more Microsoft™, Sony™, Nintendo™, etc. gaming systems), or any other suitable computing and/or video playing device, which may, for example, have one or more pieces of software installed thereon.

In various other embodiments, an interactive display and configuration system 100 may utilize one or more suitable cloud computing techniques in order to execute overlay software, underlying software, store and access one or more documents, etc. In such embodiments, one or more computer networks 115 may facilitate communication between the one or more interactive display devices 110, one or more remote servers 130, one or more databases 140, one or more remote computing devices 150, one or more third party servers 160, etc. For example, the one or more networks 115 may facilitate communication between the one or more interactive display devices 110 and the one or more remote servers 130 in order to access profile data for a user of the one or more interactive display devices 110 in order to customize the user's experience while using the one or more interactive display devices 110.

The one or more networks 115 may further facilitate access between the one or more interactive display devices 110 and a suitable document stored in one or more remote database 140 (e.g., stored in one or more remote databases managed by a third-party cloud-based storage service such as Google Drive, Dropbox, or any other suitable service). The one or more computer networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between the one or more interactive display devices 110, the one or more databases 140, and the one or more remote servers 130 may be, for example, implemented via a Local Area Network (LAN) or via the Internet.

Figure 2:
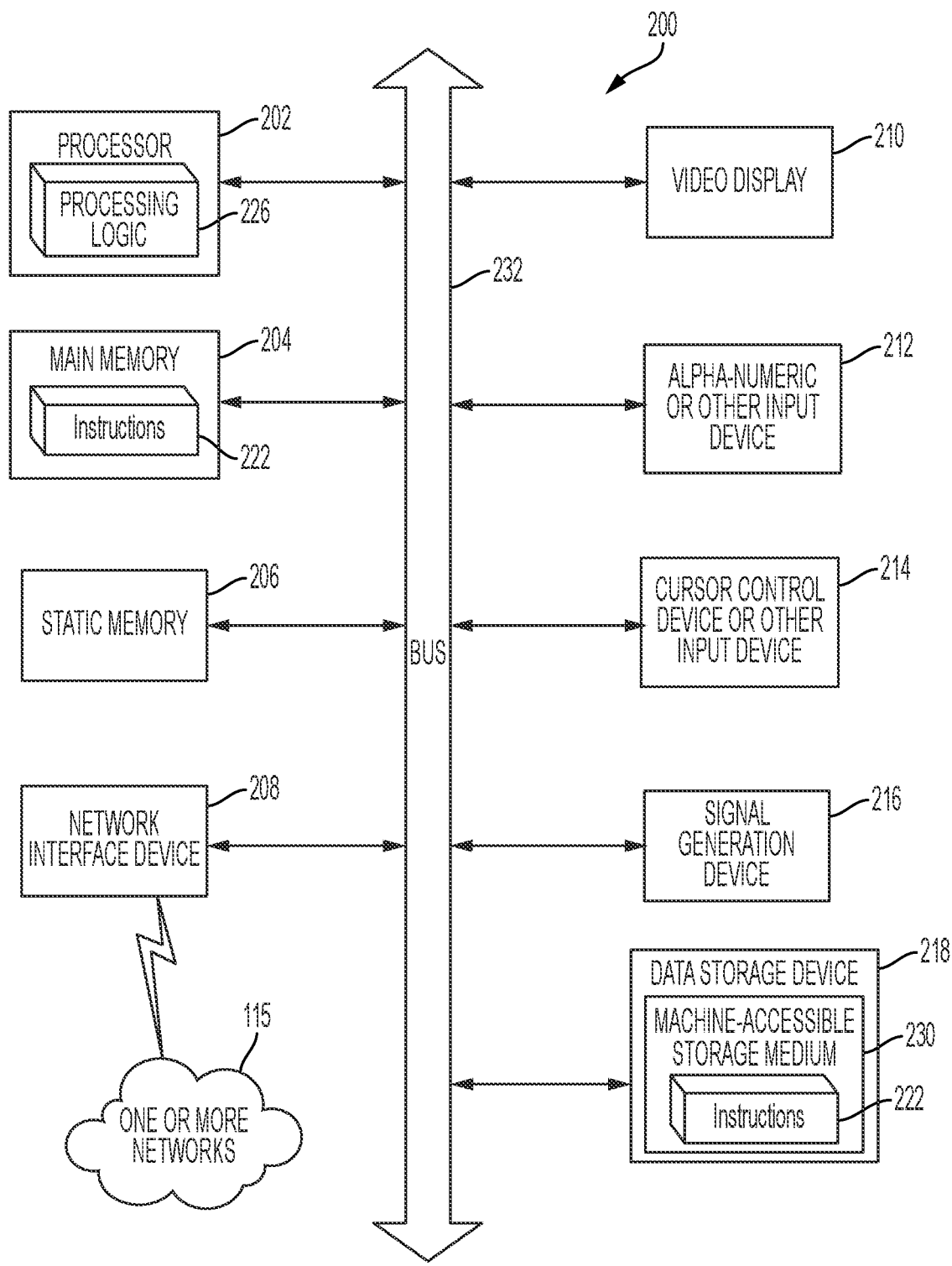
FIG. 2 is a schematic diagram of a computer, such as the one or more interactive display devices of FIG. 1, that is suitable for use in various embodiments.

FIG. 2 illustrates a diagrammatic representation of a computer architecture 200 that can be used within the interactive display and configuration system 100, for example, as a client computer (e.g., one or more interactive display devices 110 shown in FIG. 1), or as a server computer (e.g., one or more remote servers 130 shown in FIG. 1). In particular embodiments, the computer 200 may be suitable for use as a computer within the context of the interactive display and configuration system 100 that is configured to receive input from an interactive display device (e.g., such as the one or more interactive display devices 110, etc.), determine whether the input is intended for the one or more interactive display devices 110 or for the one or more connected computing devices 112, passing the input through to the proper computing device for processing.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202 (e.g., one or more computer processors), a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, Scalar Board, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD), LED display, OLED display, plasma display, a projector, a cathode ray tube (CRT), any suitable display described herein, or any other suitable display), an alphanumeric or other input device 212 (e.g., a keyboard), a cursor control or other input device 214 (e.g., a mouse, stylus, pen, touch-sensitive input device, etc.), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 200—the main memory 204 and the processing device 202 also constituting computer-accessible storage media. The software 222 may further be transmitted or received over a network 115 via a network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary Interactive Touch Screen Display Device

As may be understood in light of this disclosure, large scale interactive touch screen displays may be sizes such that a user standing in front of and otherwise interacting with the display may be unable to reach each portion of the display in order to provide input at the display. Devices on this scale, may, for example, provide technical challenges in terms of user interface configuration that are distinct from those encountered when configuring user interfaces on handheld size devices.

Figure 3:
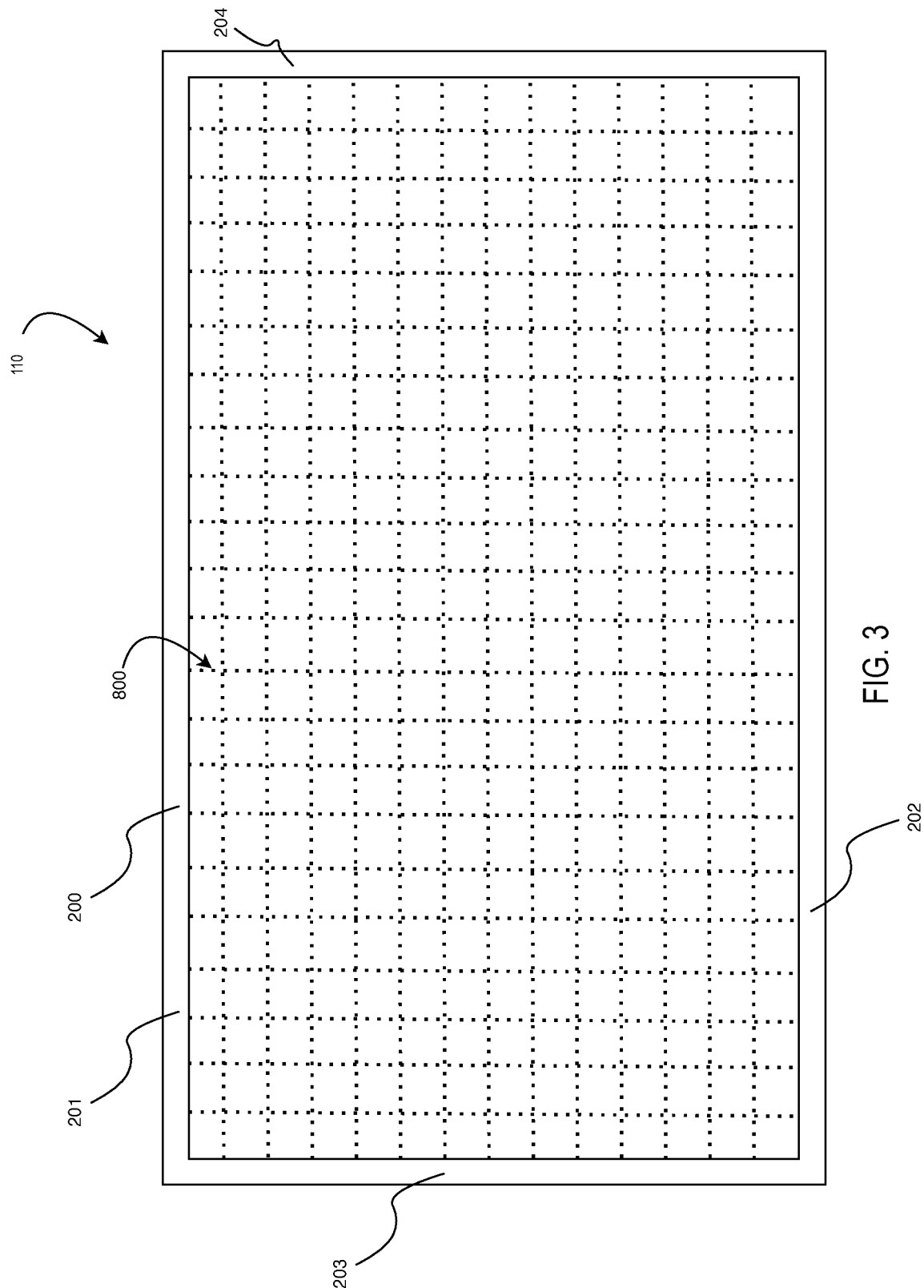
FIG. 3 is a front view of an interactive touch-screen display device depicting an exemplary light grid (e.g., infrared grid, ultraviolet light grid, combination light grid, etc.) which may be used in detection of a user's touch input on the interactive touch-screen display.

In particular embodiments, as shown in FIG. 3, the interactive display device may define a light grid for receiving input at the touch surface (e.g., in response to detecting a break in the light grid at a particular location. In some embodiments, the interactive touch screen display device 110 may house a printed circuit board (e.g., or other suitable circuitry and/or electronics) comprising a plurality of detectors and emitters. As may be understood from this disclosure, the interactive display device bezel 200 may be configured such that, when the printed circuit board is housed within the interactive display device bezel 200, each respective emitter is disposed across the interactive display device touch surface from a corresponding infrared detector. In this way, each emitter may detect light from the corresponding emitter. In various embodiment, the emitters and detectors comprise infrared emitters and detectors. In various other embodiments, the bezel may be configured to house one or more electronics comprising a plurality of emitters and/or detectors of any other wavelength of electromagnetic energy within the electromagnetic spectrum (e.g., ultraviolet light, etc.).

In some embodiments, the plurality of emitters and detectors may include one or more different types of emitters and detectors. For example, in various embodiments, the emitters and detectors may include an array of infrared emitters and detectors for detecting user inputs, in additional to one or more ultraviolet emitters disposed within the array of infrared emitters and detectors. The ultraviolet emitters may, for example, be disposed along each of the upper bezel assembly 201, lower bezel assembly 202, left bezel assembly 203, and right bezel assembly 204. In some embodiments, the ultraviolet emitters and detectors may be disposed in any suitable pattern within the infrared array (e.g., disposed between each infrared emitter and/or detector, disposed spaced apart along a printed circuit board, etc.). In some embodiments, the ultraviolet emitters include wide beam angle emitters. In various embodiments, the ultraviolet emitters are configured to emit ultraviolet light at a wavelength of between about 207 nm and about 222 nm. In some embodiments, the ultraviolet emitters are configured to at least partially disinfect (e.g., kill one or more pathogens) on the touch surface.

The printed circuit board may include a plurality of infrared emitters and detectors (e.g., which are spaced apart along a length of the printed circuit board and around the permitter of the interactive display device touch surface) such that emitters and detectors form an infrared light grid across the interactive display device touch surface. In this way, the interactive touch-screen display device 110 is configured to detect a particular touch input on the interactive display device touch surface in response to detecting a break in the infrared light grid at a particular location on the interactive display device touch surface.

As shown in FIG. 3, the interactive touch-screen display device 110, in various embodiments, comprises an interactive display device bezel 200. In particular embodiments, the interactive display device bezel 200 may comprise an upper bezel assembly 201, a lower bezel assembly 202, a left bezel assembly 203, and a right bezel assembly 204. As may be understood from this figure, the upper bezel assembly 201, lower bezel assembly 202, left bezel assembly 203 and right bezel assembly 204 may form a substantially rectangular frame that makes up the complete interactive display device bezel 200 for the interactive touch-screen display device 100. As discussed more fully herein, the interactive display device bezel 200 may house a printed circuit board comprising a plurality of infrared emitters and detectors. Each of the plurality of infrared emitters and detectors may project a plurality of vertical and horizontal light beams that form an infrared grid 800 (e.g., light grid). In particular embodiments, the infrared grid 800 is configured to detect (e.g., using a suitable computer controller or other suitable computing hardware) a disruption of one or more of the beams that make up the infrared grid 800 in order to detect a location of a user's finger (e.g., or pen or other device or body part) on the interactive display device touch surface 110.

Figure 4:
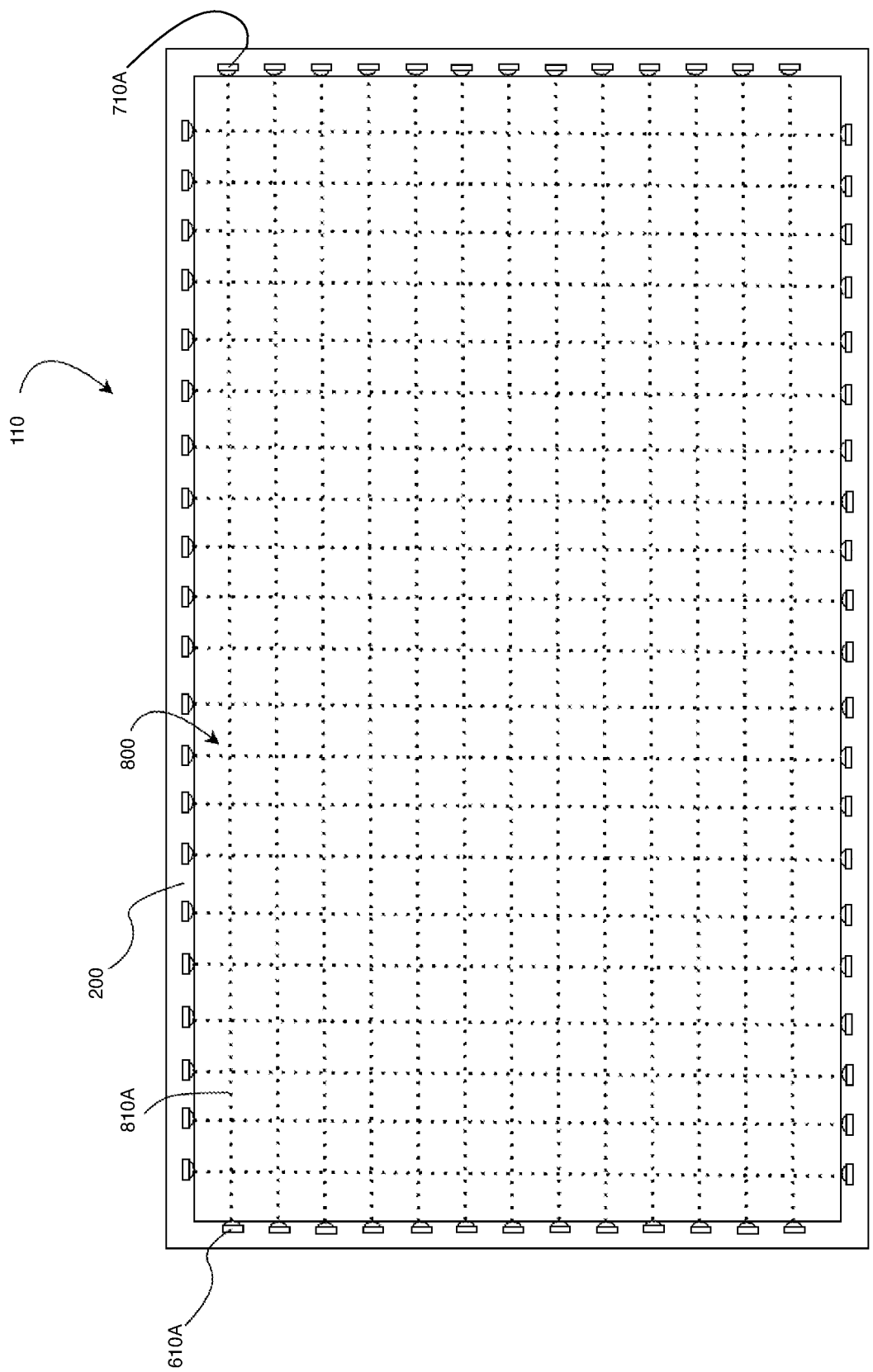
FIG. 4 depicts the interactive touch-screen display device depicting the light grid of FIG. 3, with a plurality of emitters and detectors (e.g., which may be disposed within a bezel of the interactive touch-screen display device) disposed about a perimeter of a frame of the display device, which are configured to generate the light grid.

In this way, the interactive touch-screen display device 100 may be configured to detect an input location on the interactive display device touch surface 110 in response to detecting the disruption location on the infrared grid 800. FIG. 4 depicts a cutaway view showing a plurality of emitters and detectors disposed about a perimeter of the interactive touch-screen display device 110 (e.g., disposed on a printed circuit board housed within the interactive display device bezel 200). As may be further understood from FIG. 4, the infrared grid 800 is made up of a plurality of light beams. For example, the infrared grid 800 is defined by a first infrared beam 810A formed by a first infrared emitter 610A and first infrared detector 710A. The first infrared emitter 610A may, for example, emit a first light beam (e.g., infrared beam) that is detected (e.g., detectable) by the first infrared detector 710A. A user's finger touching the interactive display device touch surface between the first infrared emitter 610A and the first infrared detector 710A may disrupt the first infrared beam 810A, enabling the interactive touch-screen display device 110 to detect an input in the horizontal plane of the first infrared beam 810A. The interactive touch-screen display device 110 may then further detect a disruption caused by the same finger touching in a particular vertical plane in order to detect a particular input location on the interactive display device touch surface.

As may be understood from this disclosure, because of the size of interactive touch screen displays (e.g., which may be wall mounted), a user presenting information on the display may be unable to reach particular portions of the display to provide input without physically repositioning themselves. For example, a user standing to the right of the display may have to walk across the display to provide input on the left-hand side of the display.

Exemplary System Platform

Various embodiments of an interactive display and configuration system 100 may be implemented in the context of any suitable interactive display device, system of interactive display devices, or any other suitable system. For example, particular embodiments may be implemented on an interactive display device, touch screen display device, one or more remote servers, or any other suitable computing device or combination of computing devices. Various aspects of the system's functionality may be executed by certain system modules, including a user interface configuration module 300. This module is discussed in greater detail below.

Although this module is presented as a series of steps, it should be understood in light of this disclosure that various embodiments of the user interface configuration module 500 described herein may perform the steps described below in an order other than in which they are presented. In still other embodiments, the user interface configuration module 500 may omit certain steps described below. In various other embodiments, the user interface configuration module 500 may perform steps in addition to those described.

User Interface Configuration Module

In various embodiments, the interactive display and configuration system 100 may be configured to reduce user fatigue (e.g., as a result of having to reach for different portions of the interactive display, step back to see different portions of the interactive display, crane the user's neck to see different portions of the display, etc.) and increase interface accessibility to a user of an interactive touch screen display device. The system may, for example, be configured to modify and/or adjust one or more user interfaces (e.g., one or more elements of the user interfaces) on the interactive display device based at least in part on one or more pieces of input data (e.g., based on receiving input, on the touch-enabled device0 at one or more particular locations). The system may, for example, be configured to modify and/or adjust a position, size, etc. of one or more user interface elements based at least in part on the user of the interactive display device and the user input received at the interactive display device.

In some embodiments, the system may be configured to modify a default (e.g., or current) position of one or more user interface features with which a user may interact toward a lower portion of the interactive display, for example, to make the user interface features easier to reach for users. As discussed above, particular embodiments of an interactive display device may include a particularly large screen which may, for example, have portions of its display that are difficult to reach due to those portions' lateral position relative to a support surface of the user (e.g., the floor). For example, a user writing on a right hand portion of the display device may be unable to reach one or more interactive elements that represent menu features in a central portion of the display (e.g., particularly when the user may have positioned their body adjacent the display device while providing input (e.g., drawing) on a particular side of the display device to enable viewers to view the display device unobstructed by the body of the user).

In particular embodiments, the system is configured to modify and/or adjust user interface positioning, size, etc. based on, for example: (1) user preference data (e.g., which the system may receive and/or determine from a user's profile when the user logs into or otherwise provides such preference data to the interactive display device using any technique described herein); (2) user input on the interactive display device (e.g., such as a location of the one or more inputs) such as a portion of the display with which the suer is currently interacting; (3) user physical characteristics (e.g., such as height, handedness, etc.).

In still other embodiments, the system is configured to: (1) track user touches (e.g., inputs) in one or more particular areas of the interactive display device (e.g., one or more areas defined by vertical sections of the display screen); (2) automatically modify a default and/or current location of one or more user interface elements based at least in part on detecting more than a threshold number of inputs in a particular vertical section; etc. This may, for example, enable the system to reduce user fatigue by modifying user interface positioning (e.g., by adjusting at least a lateral position of the interface elements) to reduce a number of times that a user has to physically move themselves in order to reach a desired interface element while interacting with the interactive display device (e.g., interacting with a particular portion of the interactive display device).

Figure 5:
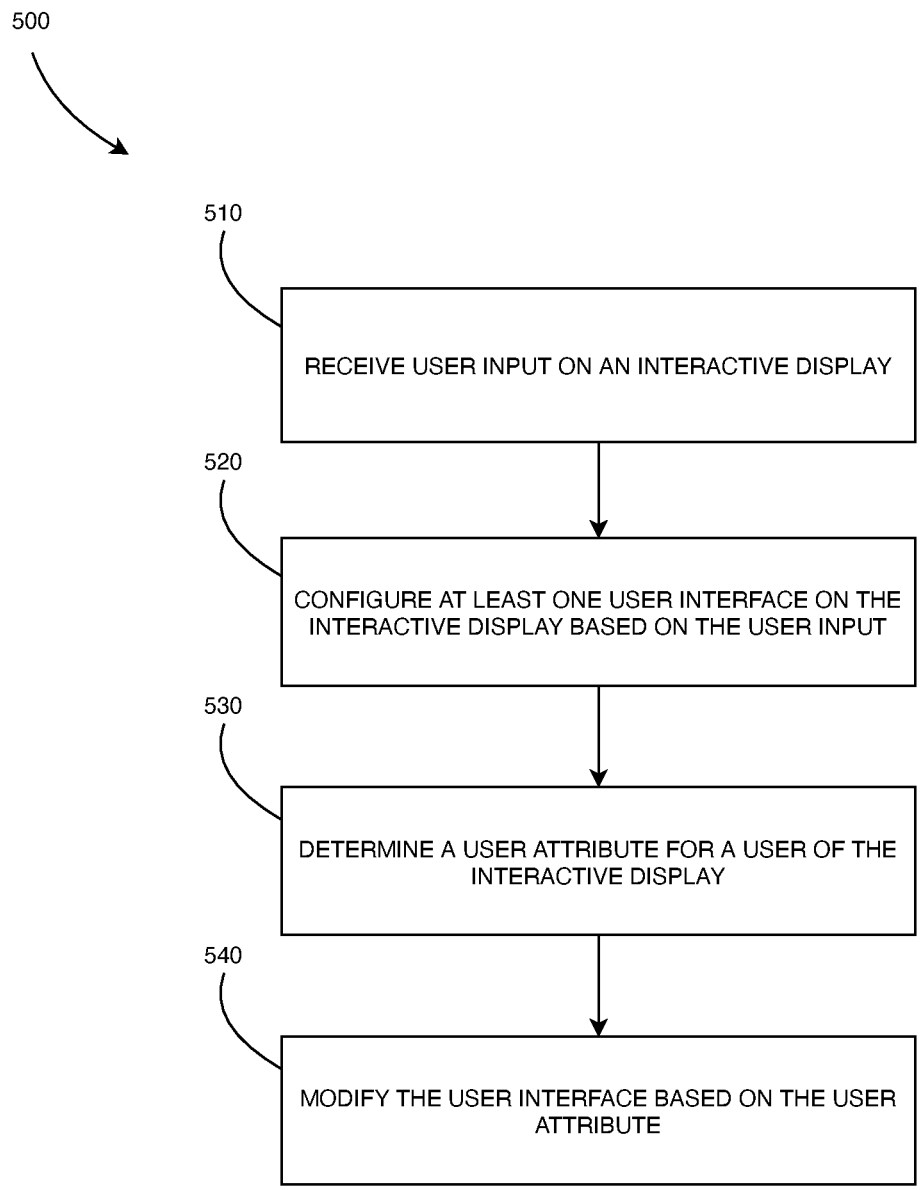
FIG. 5 depicts an example of a process for configuring a location of one or more interface elements on a graphical user interface.
Figure 11:
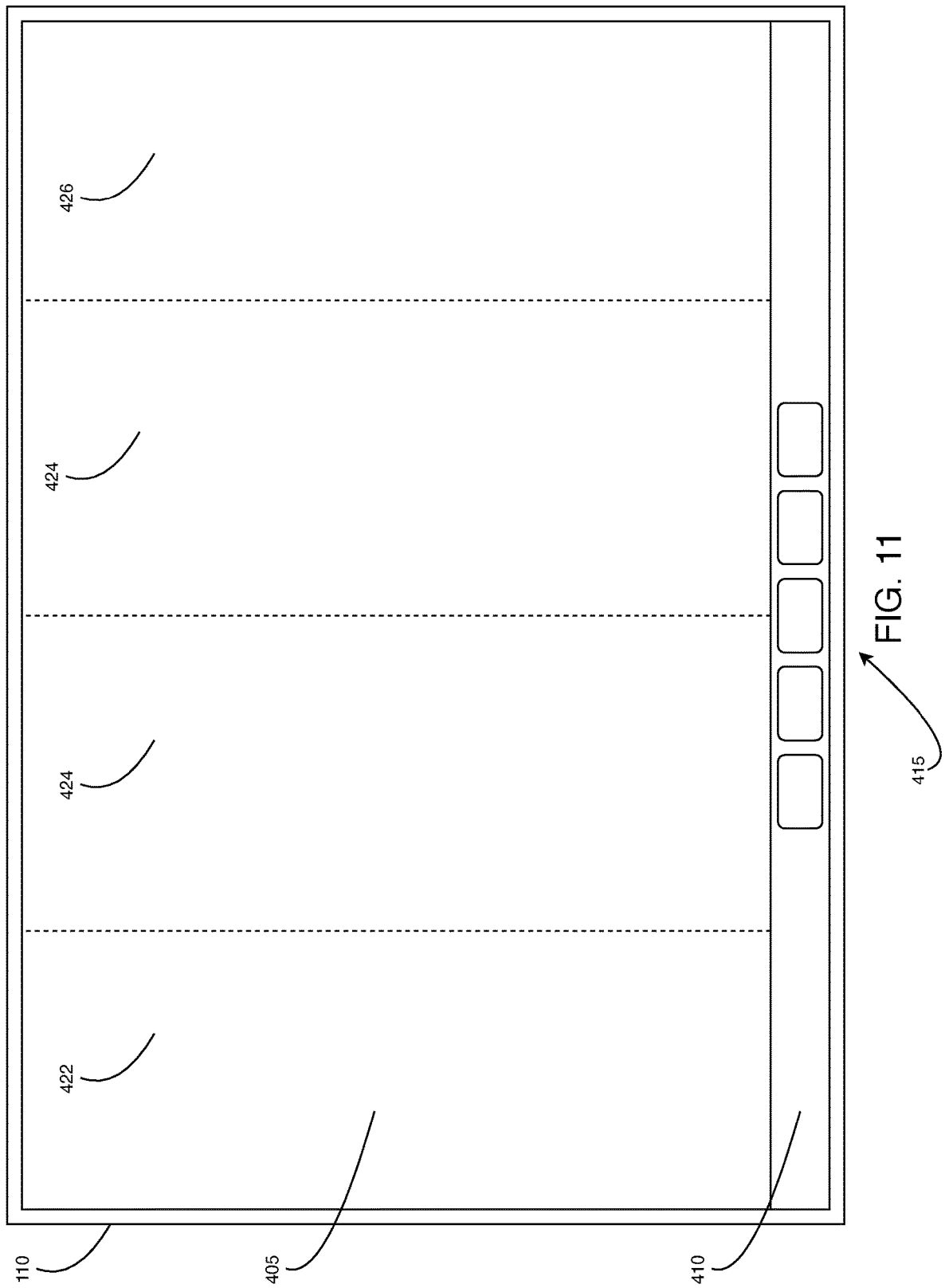

Turning to FIG. 5, in particular embodiments, when executing the user interface configuration module 500, the system is configured to, at Step 510, receive user input on an interactive display device. In particular embodiments, the user input data comprises a location of each user input. In other embodiments, the user input data comprises time data indicating a time at which each user input was received and at what location. In some embodiments, the system is configured to receive input data in each of a plurality of defined zones (e.g., as shown in FIG. 11) on the interactive display device and track a number of inputs provided in each zone. The system may, for example, define one or more zones 422, 424, 426, 428 and track user inputs within each zone. The system may then determine that a user has worked exclusively and/or primarily in a particular zone for at least a particular length of time, and then translate (e.g., modify a lateral position of) one or more interface features or elements toward that zone in response.

In some aspects, in which two users are simultaneously using the interactive display (e.g., working on different sides of the board), the system may be configured to duplicate a particular menu item or other interface element and translate each respective duplicate interface element toward each respective side of the display board. In this way, the menu or other interface element may be accessible to each user while each user is positioned on opposing sides of the display board (See, e.g., FIGS. 17 and 18).

At step 520, the system may configure and/or modify at least one user interface on the interactive display based on the user input. For example, in some embodiments, the system may configure at least one user interface element on the interactive display within a particular user interface. For example, FIGS. 6-10 depict an interactive touch-screen display device 110 with a touch surface 405 and a menu 410 disposed adjacent a bottom portion of the display. As shown in this figure, the menu 410 includes a set of menu items 415 (e.g., interface elements) disposed in the menu 410. As may be understood from these figures, the system may be configured to reposition (e.g., laterally) the set of menu items 415 within the menu (e.g., moving the menu items 415 left or right along a width of the menu) based on the input data.

Figure 9:
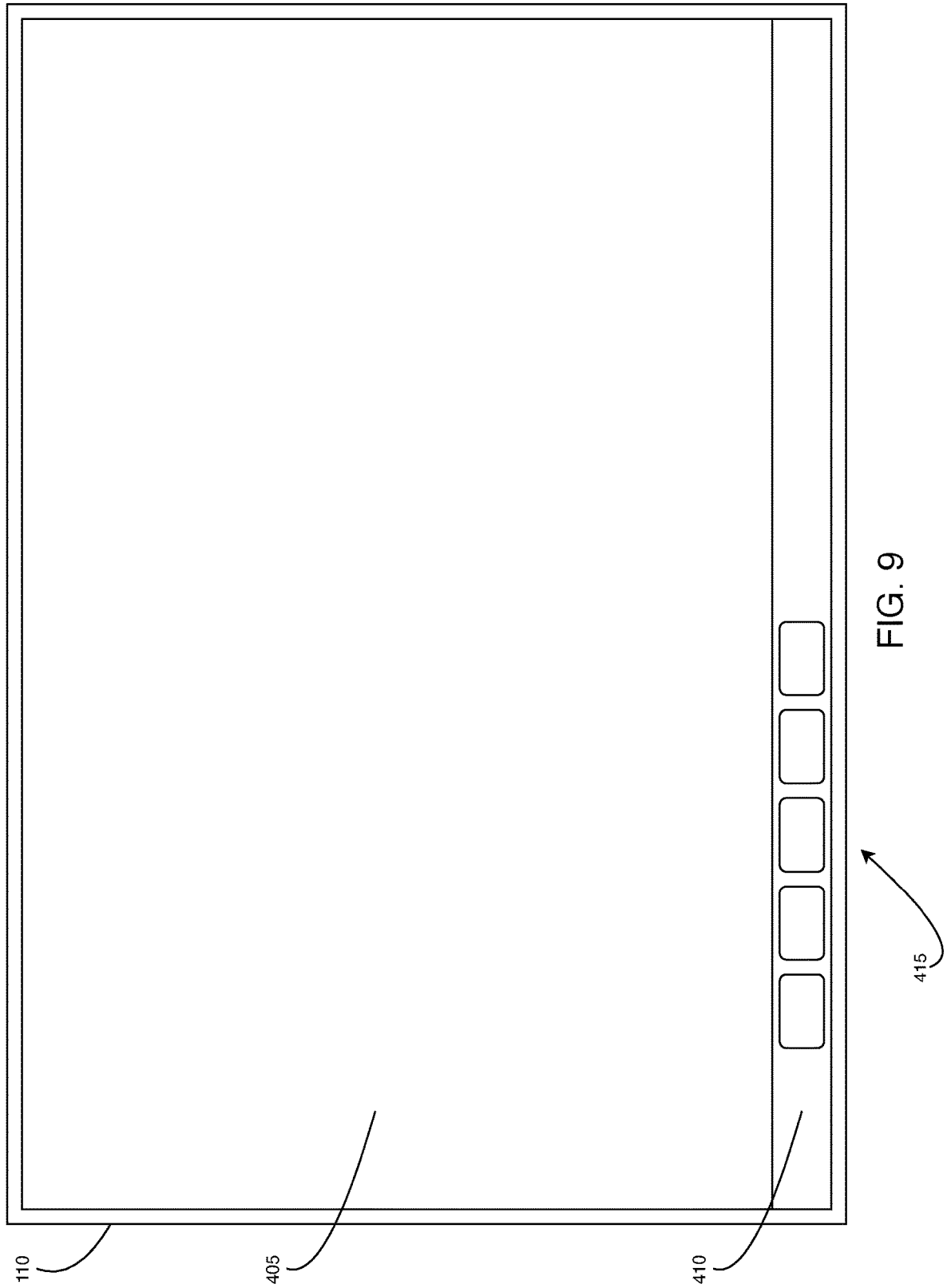
Figure 10:
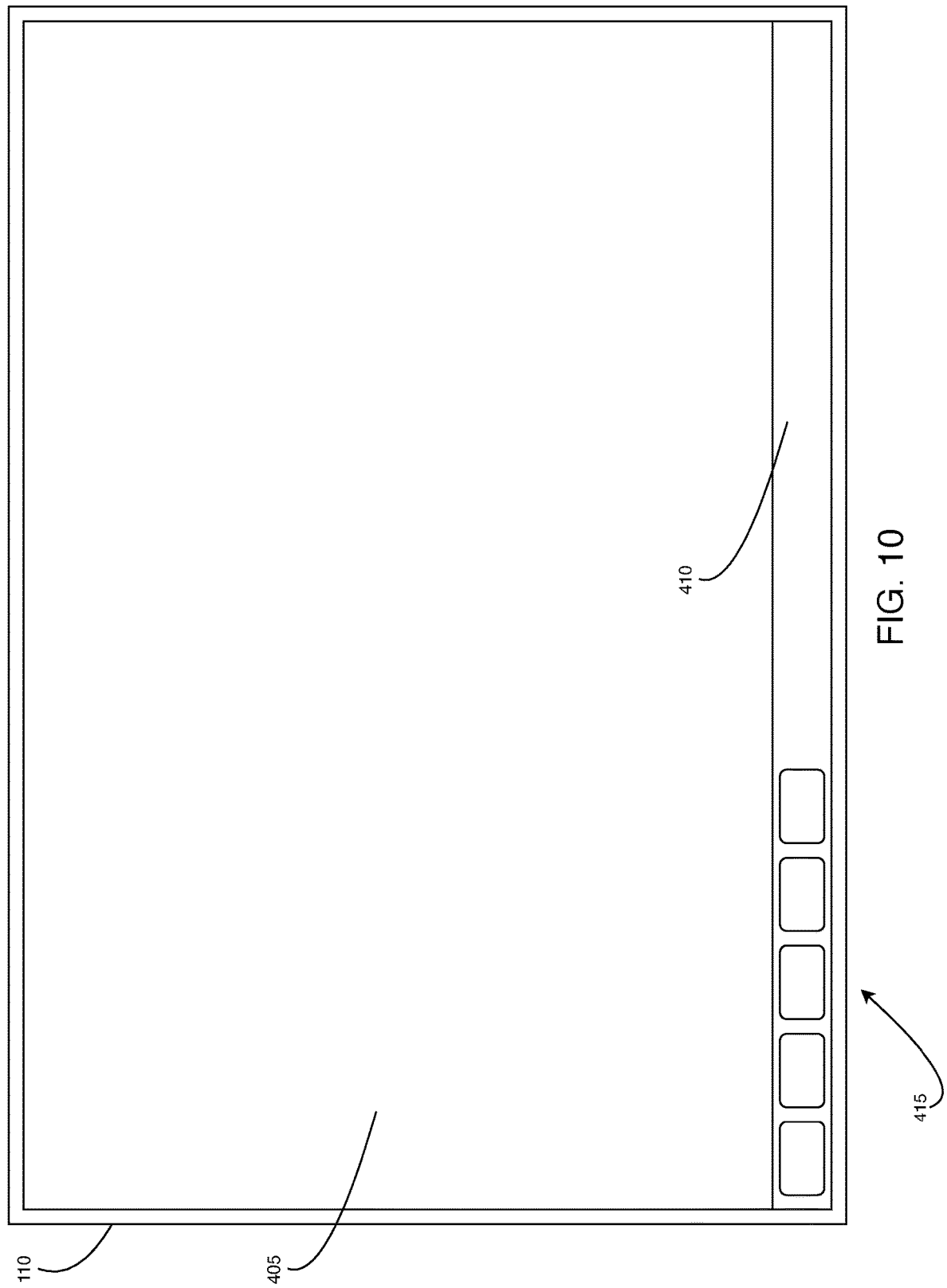

In some embodiments, the system is configured to reposition the interface elements (e.g., menu items) in response to detecting an input on the menu 410 between the set of menu items 415 and an edge of the display 110. For example, in response to detecting an input on the menu 410 between the set of menu items 415 and a left edge of the display 110, the system may modify a position of the menu items 415 to the left (e.g., substantially to the edge of the display as shown in FIG. 10 or to a position between the default (initial), center position and the edge of the display as shown in FIG. 9, etc.). In some embodiments, the system may be configured to translate the set of menu items 415 toward a position of the detected input gradually (e.g., increase the lateral offset from the default position in response to detecting more and more inputs on that portion of the menu 410).

In particular embodiments, the system is configured to reposition the menu items 415 in response to detecting input on a particular portion of the display surface 405. For example, the system may bias the set of menu items 415 (e.g., or other interface elements) in a direction that corresponds to a relative position of the detected inputs and the default, central menu item 415 position (e.g., by translating the set of menu items 415 within the menu 410 towards a position of the detected inputs). In some aspects, the system may gradually translate the set of menu items 415 in the direction of the inputs as the system detects more inputs in that relative location. For example, as a user works on the left side of the display surface 405 (e.g., writing, drawing, etc.), the system may gradually shift the set of menu items 415 to the left (e.g., such that the set of menu items 415 gradually moves closer to the portion of the display board 110 on which the user is working, thereby placing the set of menu items 415 within the reach of the user). In this way, the system may limit interface element repositioning to situations in which the user is continually working on a particular portion of the display (e.g., as opposed to repositioning the elements when the user only provides one or more touch inputs in that portion of the display).

In particular aspects, the system may rearrange the set of menu items 415, for example, to adjust a position of a particular menu item or other interface element that is most used closer to the side of the display board 110 toward which the system is translating the set of menu items 415. In this way, the most useful interface elements (e.g., menu items) may be most accessible to the user in their current position. For example, the right-most menu item may be the most utilized menu item but may still be difficult to reach when the user is working on the left side of the display. By rearranging the items within the menu, the system may provide the most accessible, user-optimized order and position of the menu items.

In any aspect described herein, the set of menu items 415 may include one or more interface elements for, for example: (1) launching particular software applications; (2) accessing device settings; (3) modifying one or more features of a currently active software application (e.g., selecting an eraser function, modifying a color of a user touch input, changing a font size, selecting a pre-made object for insertion onto the display, etc.); and/or (4) any other suitable menu item or interface element.

Figure 6:
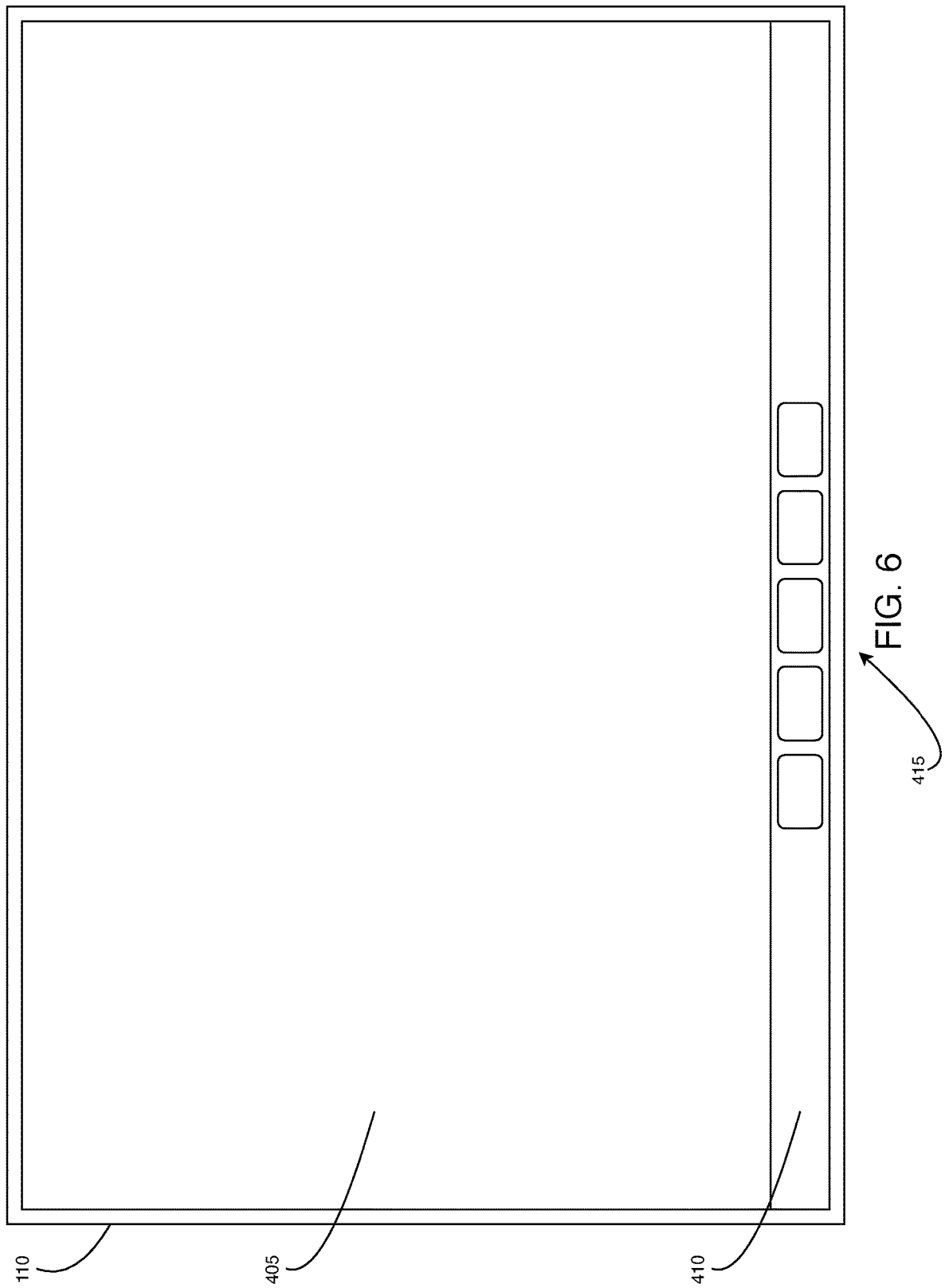
FIGS. 6-18 depict exemplary user interfaces in accordance with various embodiments of the present system.

In some embodiments, the system is configured to return the one or more interface elements to a default or other initial position (e.g., central position relative to the display board as shown in FIG. 6) in response to determining that a particular length of time has passed since the last user input. This may, for example, cause the interactive touch-screen display device to return the interface elements (e.g., set of menu items) to the default position shown in FIG. 6 (e.g., because once enough time has passed since the last input, it is likely that the user has ceased using the display device or the previously identified portion of the display device, or may have moved to a different position such that the default position may be the most accessible, or the system may be required to determine a more suitable location once the user resumes interaction with the device). In some embodiments, the system may be configured to return the interface elements to the default position immediately. In other embodiments, the system may be configured to gradually translate (e.g., over time) the interface elements from a current position (e.g., the position shown in FIG. 8) to the default position shown in FIG. 6 by translating the set of menu items 415 from the right-hand position shown in FIG. 6 to the default position (e.g., such that the set of menu items 415 would be positioned at the position shown in FIG. 7 at some point during the translation).

In still other embodiments, the system is configured to modify the position of one or more user interface elements in response to identifying a direction of one or more user inputs. For example, as a user writes on the interactive display device (e.g., from a left portion of the display toward a right portion of the display), the system may modify a position of one or more user interface elements toward the right hand portion of the display by adjusting the position of the one or more user interface elements at a rate that substantially matches (e.g., corresponds to) a rate at which the user is writing. In this way, the system may modify the position such that one or more interface elements follow the user as the user writes across the interactive display device, making the one or more user interface elements accessible to the user as the user writes across the display board. The system may further determine a direction and rate at which the user is writing across the display board to define an input vector (e.g., defining a direction and speed). The system may then modify a position of the one or more interface elements according to the vector (e.g., by moving the interface elements in the direction defined by the vector at the rate defined by the vector). In this way, the interface element and/or element(s) may 'follow' the user as the user writes across the display surface, so that the interface is always physically accessible from the current position in which the user is positioned relative to the display and currently providing input (i.e., writing).

Continuing to Step 530, the system is configured to determine a user attribute for a user of the interactive display device. The user attribute may include, for example, one or more default user preferences, a handedness of the user, etc. The system may, for determine user attribute data in response to a user logging into a particular interactive display (e.g., using any suitable login technique described herein). The system may, for example, be configured to store user attribute data in association with a user account. The system may be configured to prompt each user to provide user attribute data, for example, at any suitable point during an account registration process (e.g., during registration, the first time the user uses an interactive display, etc.). The system may then be configured to store the user attribute data in order to apply one or more user settings substantially automatically (e.g., automatically) in response to the user logging into an interactive display device (e.g., at a later time). The system may further use the user attribute data to modify user interface position, for, example, as the system receives input data (e.g., input locations).

In still other embodiments, the system is configured to use one or more imaging devices operatively connected to a particular interactive display device (e.g., one or more cameras) in order to determine a position of the user relative to the display (e.g., which may represent a user attribute). The system may then modify a user interface element position based on the user's position (e.g., to move the one or more elements closer to a position of the user such that the elements are within the user's reach). In still other embodiments, the system is configured to use data received from one or more proximity sensors to determine a location of the user (e.g., relative to the interactive display device. The system may then be configured to reposition one or more user interface elements based on the determined relative location of the user. For example, in a particular embodiment, the interactive display device may comprise one or more proximity sensors (e.g., IR sensors, indictive proximity sensors, capacitive proximity sensors, ultrasonic proximity sensors, etc.). The system may then detect, based on feedback from the one or more proximity sensors, a location of the user relative to the interactive display device (e.g., a lateral position of the user in front of the interactive display device). In this way, the system may be configured to adjust a lateral position of the user interface elements such that the user interface elements substantially track a position of the user with respect to the interactive display device as the user moves laterally in front of the interactive display device.

In a particular example, the interactive display device may comprise a plurality of proximity sensors distributed laterally across a width of the interactive display device. The system may receive proximity data from each of the proximity sensors and use the proximity data to determine a lateral location of the user relative to the interactive display device (e.g., in the middle of the display device, adjacent a left or right side of the display device, and/or somewhere in between, etc.). The system may then be configured to modify a lateral position of one or more user interface elements such that the user interface elements are positioned laterally to substantially correspond to the lateral position of the user (i.e., such that the user interface elements are positioned substantially in front of the user (e.g., and within arm's reach of the user) wherever the user is positioned in front of the display device. In some embodiments, the system is configured to substantially continuously (e.g., continuously) modify the user interface elements as the user moves back and forth in front of the interactive display device. In still other embodiments, the system is configured to modify the lateral position of the user interface elements after a particular length of time following movement of the user (e.g., by biasing the one or more user interface elements toward the lateral position of the user after a period of time, gradually over a period of time, etc.). In some embodiments, the gradual or delayed repositioning may prevent continuous interface movement, which may, for example, make it more difficult for a user to accurately interact with the moving interface elements).

In still other aspects, the system may be configured to modify a position of the user interface elements based on both a position of the user and a handedness of the user. For example, the system may determine the lateral position of the user and position the user interface elements adjacent a side of the user's lateral position based on the user's handedness (e.g., on the user's left side for a left-handed user and/or on the right side of the user's current position for a right-handed user or vice versa). In such embodiments, the system may be configured to position (e.g., reposition) a particular user interface or interface element adjacent a side of the portion of the display device with which the user is interacting based on the handedness of the user. For example, the system may be configured to determine a final position of an interface being repositioned based on the handedness of the user (with an ending position that is further right for right handed users compared to further left for lefthanded users). reposition a user interface element In various embodiments, at Step 540, the system may further modify the user interface (e.g., elements of the user interface such as a set of menu items 415) based on the user attribute. For example, based on a position of the user, the system may cause the set of menu items 415 to 'shadow' the user, for example, by adjusting a position and/or ordering of the set of menu items 415 within the menu 410 such that the set of menu items 415 is most physically accessible to the user, customized to the user themself. In other aspects, the system may modify a position of one or more interface elements based on a handedness of a user (e.g., the system may translate the set of menu items further to the right for a right-handed user when the user is working on the right side of the board than the system would for a left-handed user). The system may, for example, store profile data for a user that includes the user's dominant hand. The system may then access the profile date (e.g., in response to a user logging into the interactive display device, in response to identifying the profile data based on identifying the user, etc.). The system may then modify any user interface element adjustment based on the stored dominant hand data for the user (e.g., as discussed herein). For example, the system may modify an adjustment to the user interface to modify the adjustment based on the user's dominant hand. In a specific example, the system may modify the adjustment such that the user interface element is adjusted at least somewhat further right for a right-handed user and at least somewhat further left for a left-handed user.

Exemplary System Implementation

As described herein, certain embodiments provide improvements to graphical user interface generation by including a specific structure in a generated user interface that provides a specific function derived from that specific structure. For example, in various embodiments, a generated user interface comprises a plurality of interface elements that correspond to a particular menu or interface structure. In other embodiments, the system may modify (e.g., on-the fly) a structural position of one or more interface elements to improve the efficiency of a user using the display device by modifying the structure to improve the accessibility of each of the interface elements. As such, various embodiments described herein are directed to a specific improved method for displaying, accessing, and selecting elements of the generated user interfaces, particularly when the generated user interfaces include a structure defined by user input data and other data.

FIG. 6 depicts an exemplary user interface displayed on an interactive touch screen display device 110. As may be understood from this figure, the interactive touch screen display device 110 includes a touch surface 405 (e.g., any suitable touch surface or touch-enabled input device described herein) configured for receiving user input (e.g., writing, drawing, etc.). In particular embodiments, an interactive touch screen display device 110 may provide computing functionality that includes one or more whiteboard or blackboard applications such that the interactive touch screen display device 110 may function as a traditional whiteboard, with enhanced computing functionality. In the example shown in this figure, the user interface includes a menu 410 disposed adjacent a lower portion of the interactive touch screen display device 110. In other aspects, the menu 410 may be disposed in any other portion of the interactive touch screen display device 110 (e.g., by default). As shown in FIG. 6, the menu 410 includes a 41. In any aspect described herein, the set of menu items 415 may include one or more interface elements for, for example: (1) launching particular software applications; (2) accessing device settings; (3) modifying one or more features of a currently active software application (e.g., selecting an eraser function, modifying a color of a user touch input, changing a font size, selecting a pre-made object for insertion onto the display, etc.); and/or (4) any other suitable menu item or interface element.

Figure 7:
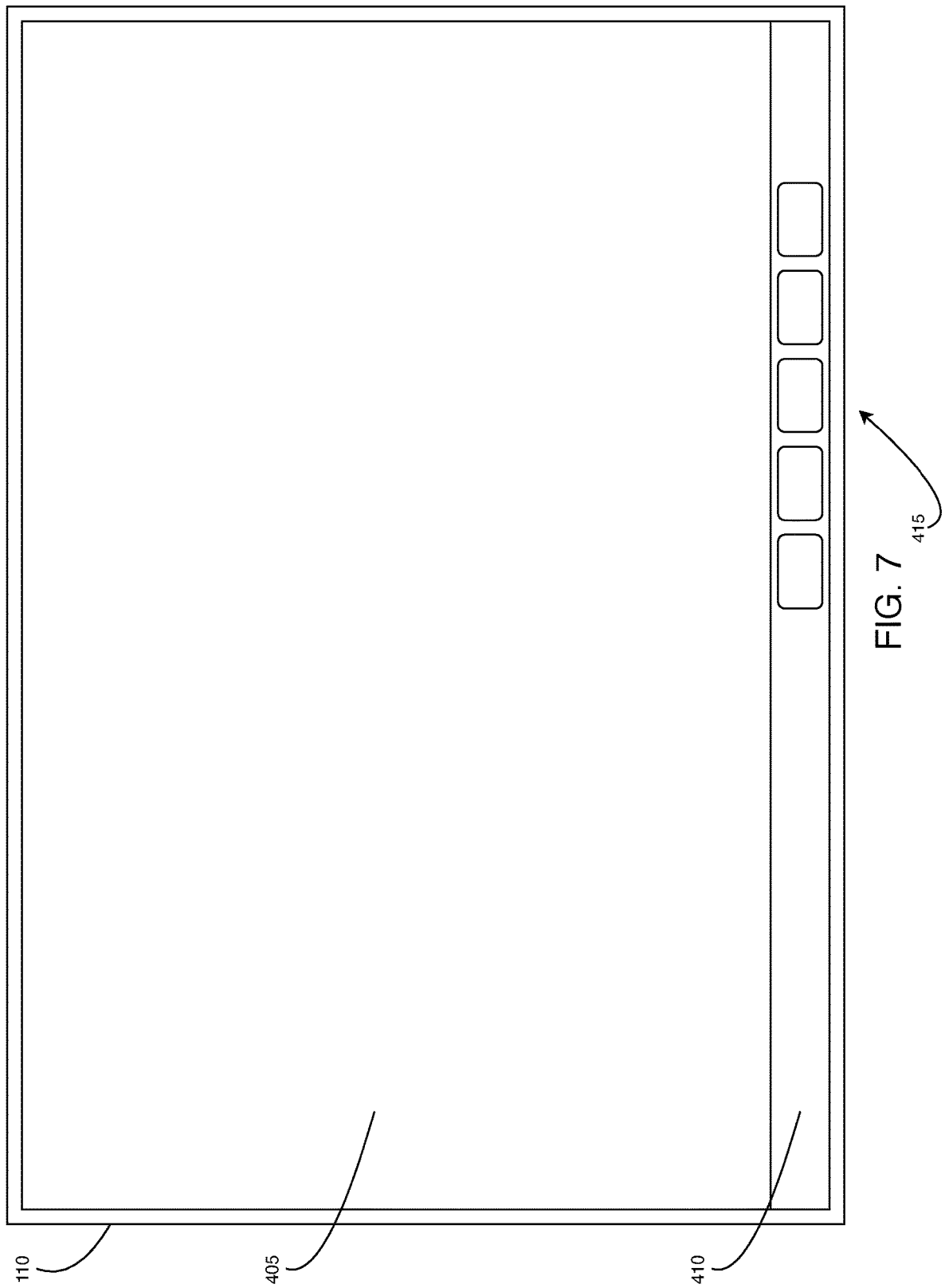
Figure 8:
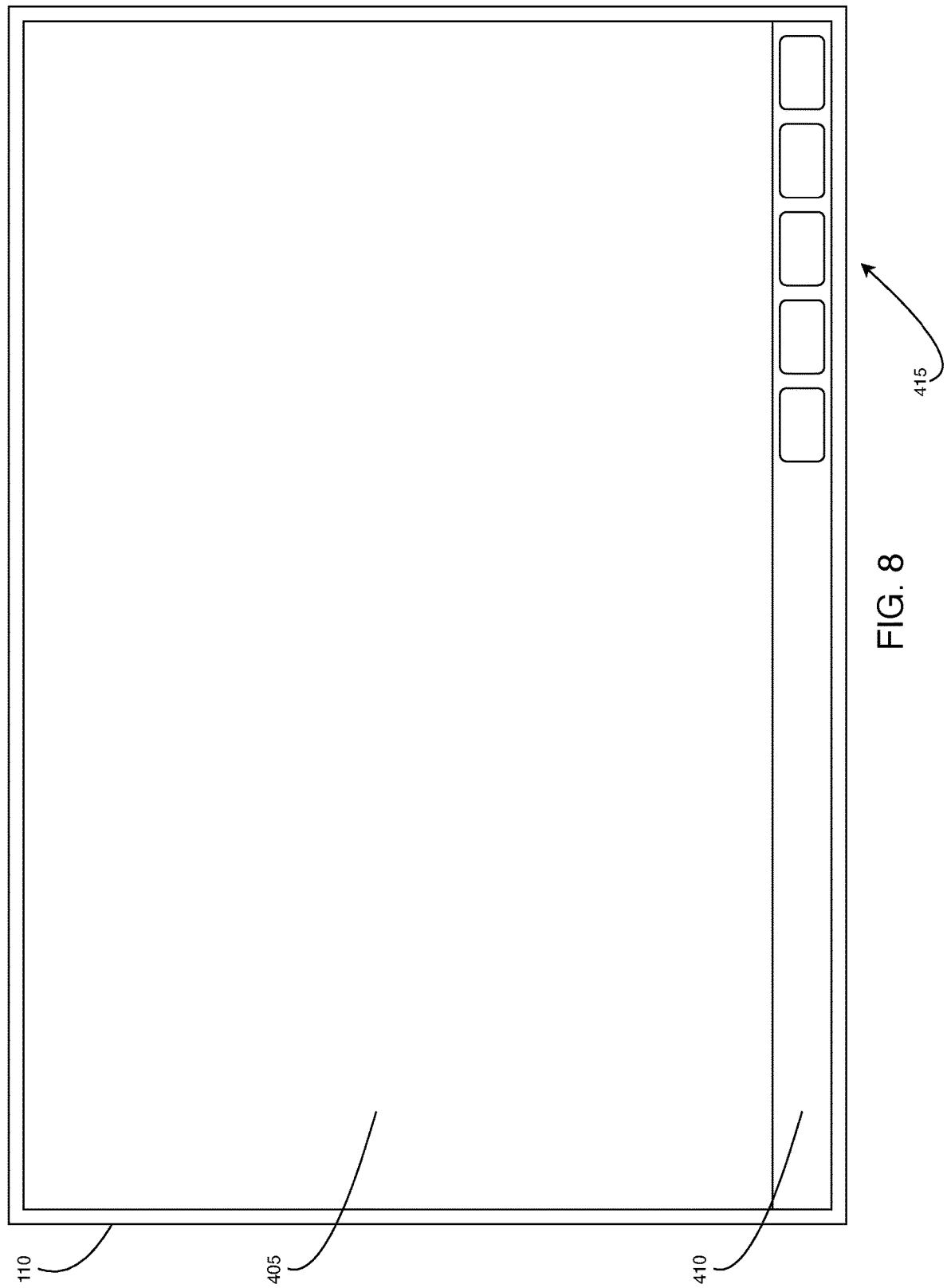

As may be understood in light of this disclosure, in response to detecting user input on a particular portion of the interactive touch screen display device 110, the system may be configured to modify a position of the menu 410 such that the set of menu items 415 is disposed in a position that is closer to the particular portion of the interactive touch screen display device 110 that the default, initial position shown in FIG. 6. For example, in response to detecting user input on the touch surface 405 predominantly on a right-hand side of the interactive touch screen display device 110, the system may be configured to translate (e.g., slide or otherwise reposition) the set of menu items 415 within the menu 410 toward the righthand side of the interactive touch screen display device 110 as shown in FIGS. 7 and 8. Similarly, the system may, in response to detecting user input on the touch surface 405 predominantly on a left-hand side of the interactive touch screen display device 110, the system may be configured to translate (e.g., slide or otherwise reposition) the set of menu items 415 within the menu 410 toward the left-hand side of the interactive touch screen display device 110 as shown in FIGS. 9 and 10.

In some embodiments, the system is configured to return the one or more interface elements to a default or other initial position (e.g., central position relative to the display board as shown in FIG. 6) in response to determining that a particular length of time has passed since the last user input. This may, for example, cause the interactive touch-screen display device to return the interface elements (e.g., set of menu items) to the default position shown in FIG. 6 (e.g., because once enough time has passed since the last input, it is likely that the user has ceased using the display device or the previously identified portion of the display device, or may have moved to a different position such that the default position may be the most accessible, or the system may be required to determine a more suitable location once the user resumes interaction with the device). In some embodiments, the system may be configured to return the interface elements to the default position immediately. In other embodiments, the system may be configured to gradually translate (e.g., over time) the interface elements from a current position (e.g., the position shown in FIG. 8) to the default position shown in FIG. 6 by translating the set of menu items set of menu items 415 from the right-hand position shown in FIG. 6 to the default position (e.g., such that the set of menu items set of menu items 415 would be positioned at the position shown in FIG. 7 at some point during the translation).

In some embodiments, the system is configured to receive input data in each of a plurality of defined zones (e.g., as shown in FIG. 11) on the interactive display device and track a number of inputs provided in each zone. The system may, for example, define one or more zones 422, 424, 426, 428 and track user inputs within each zone. The system may then determine that a user has worked exclusively and/or primarily in a particular zone for at least a particular length of time, and then translate (e.g., modify a lateral position of) one or more interface features or elements toward that zone in response. For example, in response to detecting user input predominantly in zone 422, the system may be configured to modify the position of the set of menu items 415 to the position shown in FIG. 10 on the left side of the display. In response to detecting user input predominantly in zone 424, the system may be configured to modify the position of the set of menu items 415 to the position shown in FIG. 9 toward but not all the way toward the left side of the display.

Figure 12:
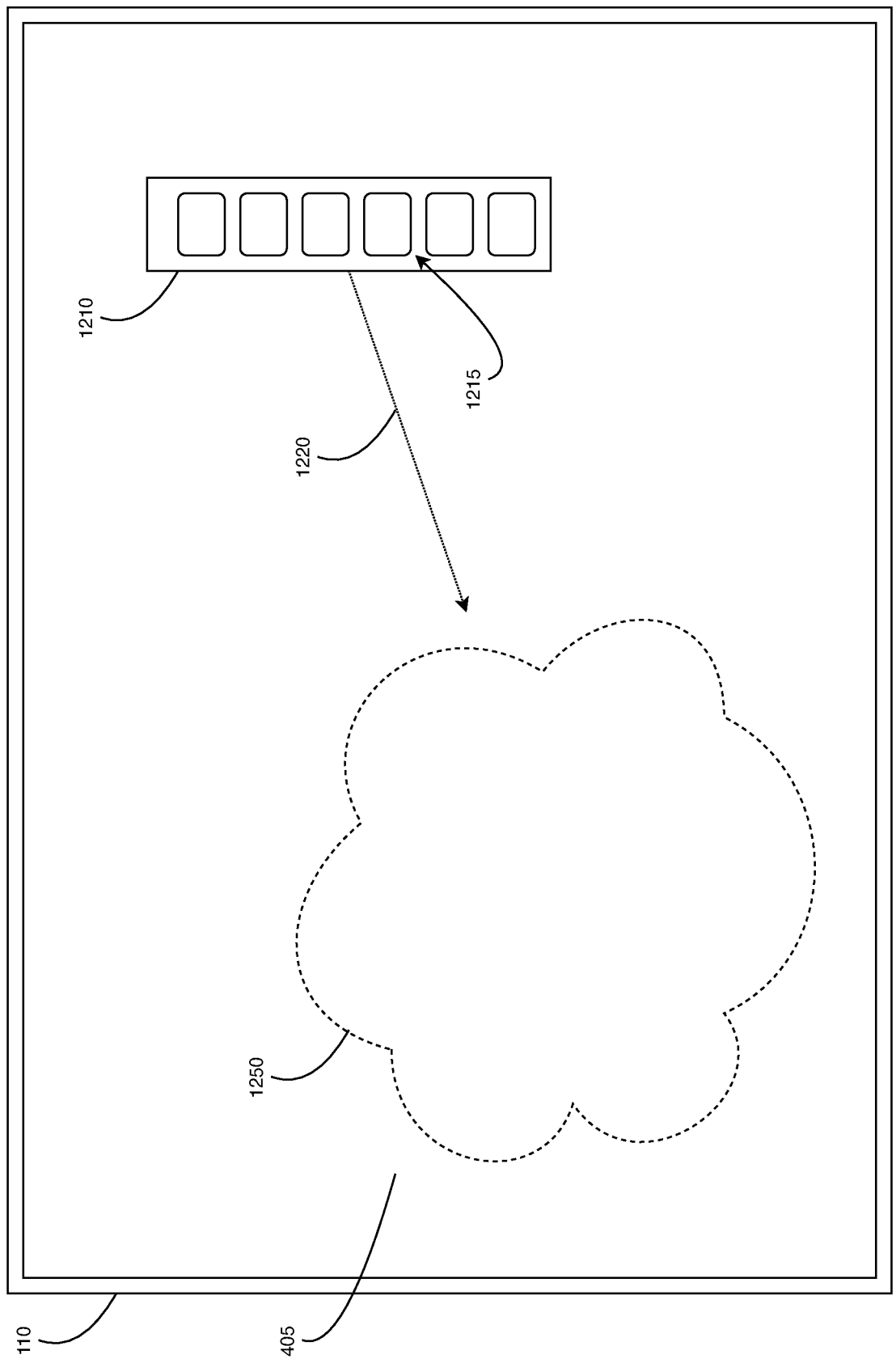

FIG. 12 depicts yet another user interface modification that the system may cause in response to particular user input data. In some embodiments, the system may be configured to identify a primary input location zone 1250, that includes a particular area in which a user is providing input over a particular time period. The system may define a primary input location zone 1250 that includes any suitable shape and has any suitable size. The system may, for example, define the primary input location zone 1250 with a size that includes all points within a particular distance of the most recent user inputs (e.g., most recent inputs over a period of time, most recent particular number of inputs, etc.). In particular embodiments, the primary input location zone 1250 may substantially continuously change (e.g., the system may continuously update the defined primary input location zone 1250) as the user continues to interact with the interactive touch screen display device 110.

The user may, for example, be writing information in the primary input location zone 1250 (e.g., making notes, doing a math problem, etc.). The interactive touch screen display device 110 may include a user interface 1210 that includes a set of interface elements 1215. The set of interface elements 1215 may include, for example, user-selectable objects for modifying user interaction with the interactive touch screen display device 110. This may include, for example: input color, line thickness, pre-made objects for placing on the touch surface 405, an eraser function, etc. As may be understood in light of this disclosure, the system may be configured to modifying a position of the user interface 1210 as the user is working in the primary input location zone 1250. The system may, for example, define a user interface repositioning vector 1220 (e.g., a vector along which the user interface 1210 is to be translated as the user works in the primary input location zone 1250). In various embodiments, the system may, for example, define the user interface repositioning vector 1220 by determining a center of mass of the primary input location zone 1250 and defining the user interface repositioning vector 1220 as a line between a center of mass of the user interface 1210 and the center of mass of the user interface repositioning vector 1220. In other aspects, the system may define the user interface repositioning vector 1220 continuously as the user continues to provide input in the primary input location zone 1250, for example, the system may define the user interface repositioning vector 1220 as a lien between the current position of the user interface 1210 and the last input location provided by the user. In this way, as the system adjusts the position of the user interface 1210 form an initial position toward the primary input location zone 1250, the system may adjust a path of travel of the user interface 1210 as the user works within the primary input location zone 1250, as the position of the primary input location zone 1250 changes, etc. In some embodiments, the user interface repositioning vector 1220 may be linear. In other embodiments, the user interface repositioning vector 1220 may be other than linear (e.g., curved, etc.).

Figure 13:
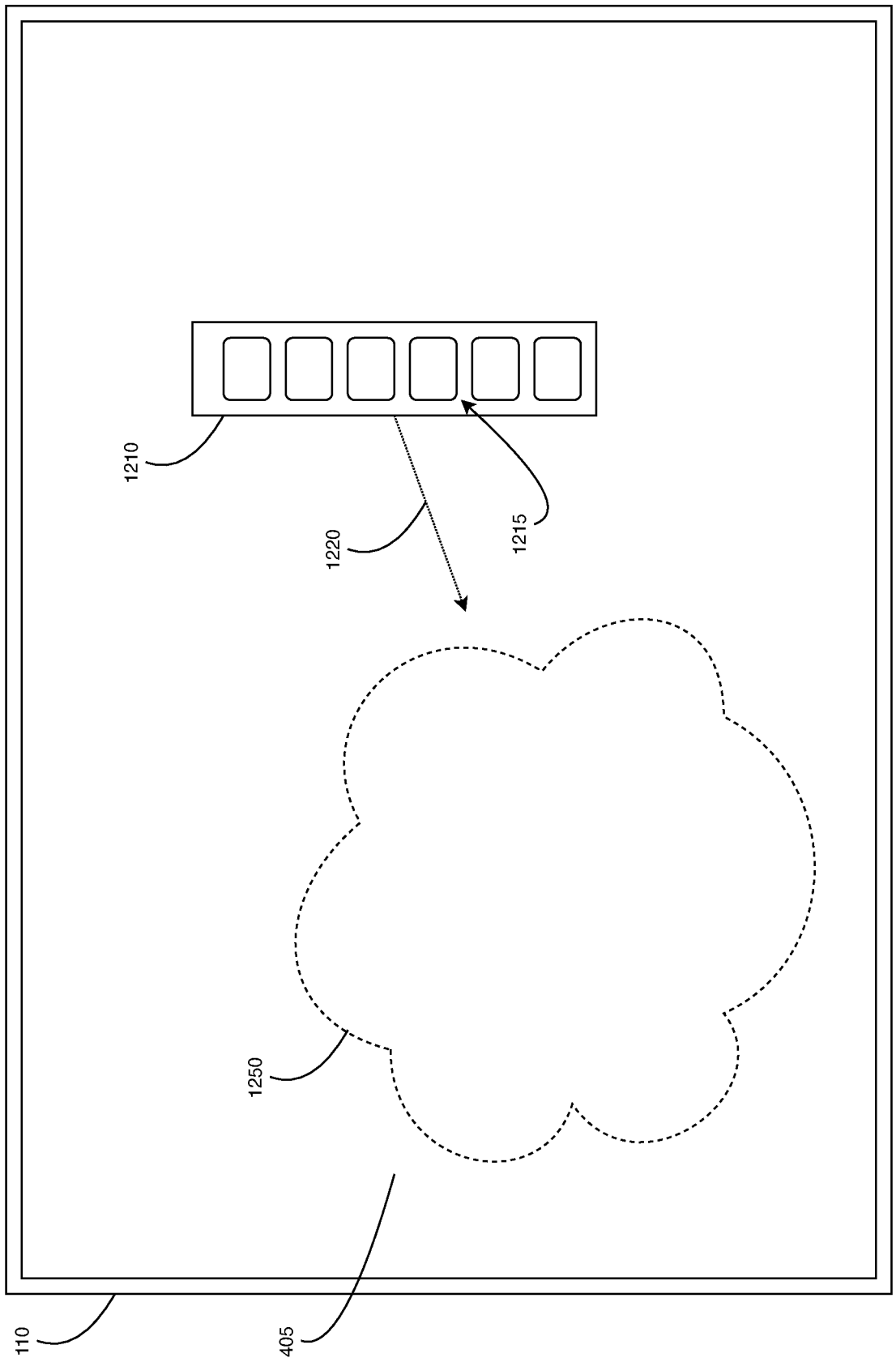
Figure 14:
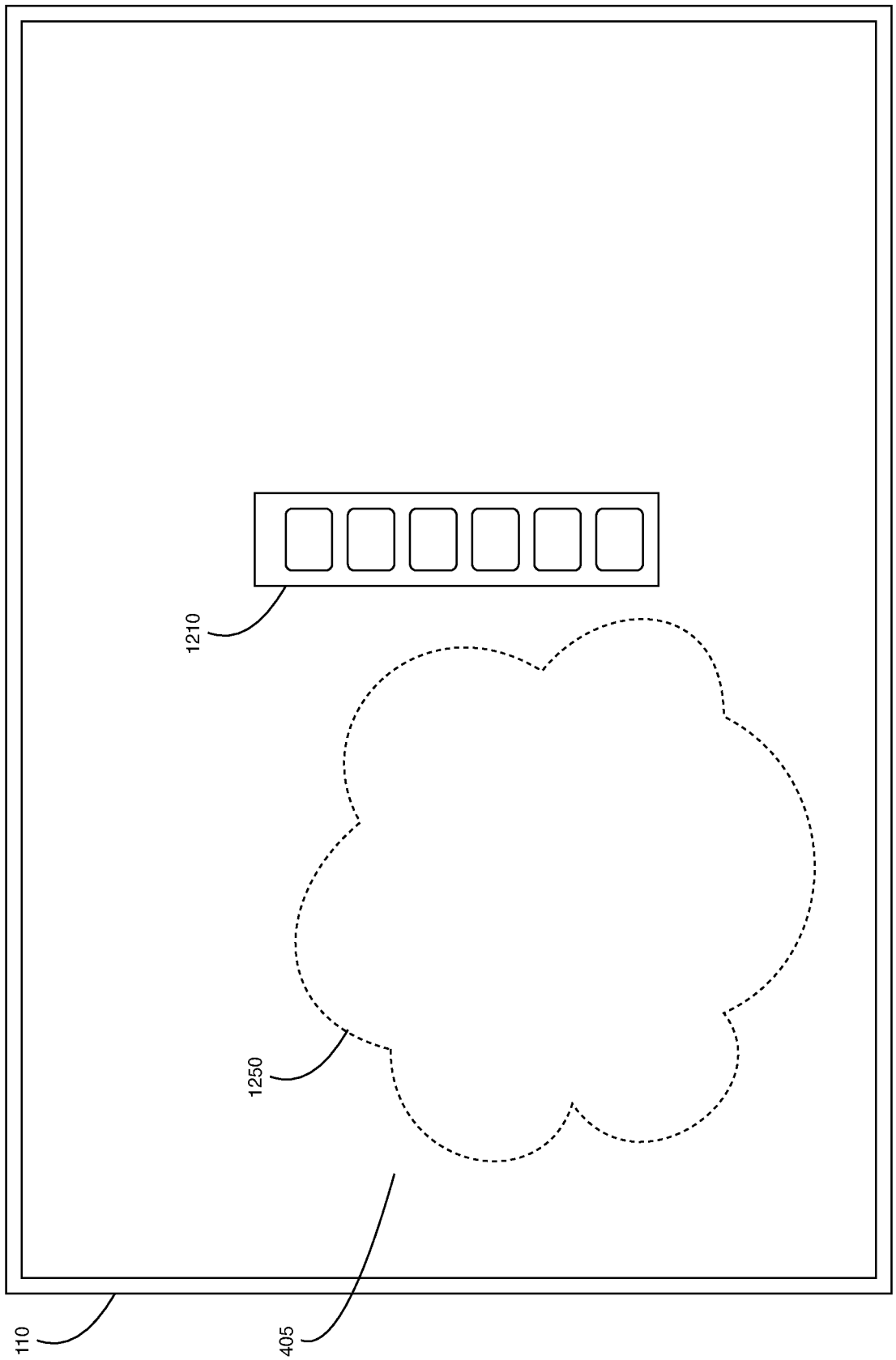

FIGS. 13 and 14 depict the user interface 1210 in varying positions between an initial and final position (e.g., as defined by the user interface repositioning vector 1220). As may be understood in light of this disclosure, the system may gradually reposition the user interface 1210 toward the primary input location zone 1250. In other embodiments, the system may be configured to modify the position of the user interface 1210 toward a default or initial position in response to a passage of a particular length of time from a last user input (e.g., which may indicate that the user has stopped working in the primary input location zone 1250 and may no longer need to access the user interface 1210 from that position).

Figure 15:
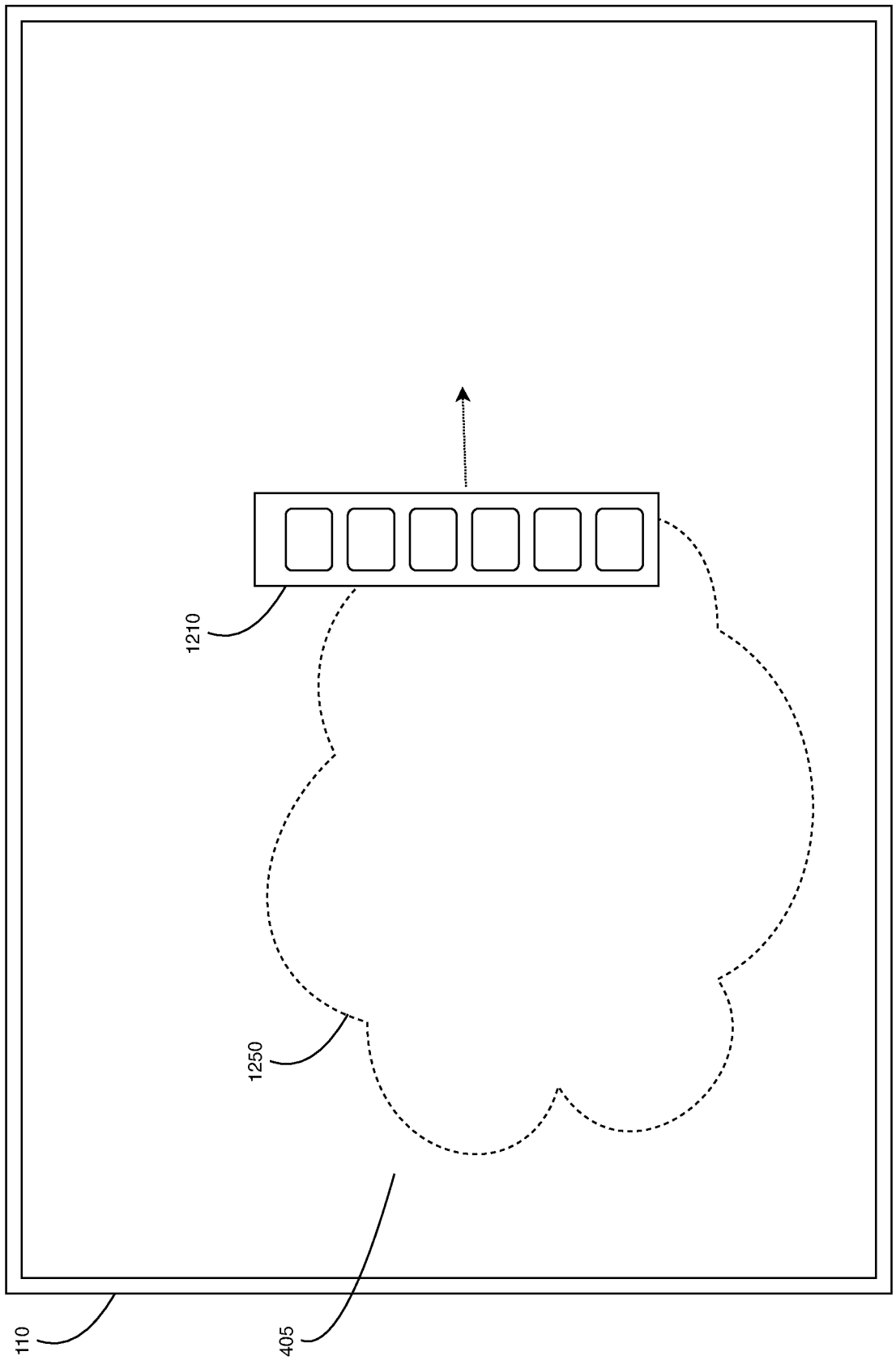

In still other aspects, as shown in FIG. 15, the system may be configured to modify a position of a user interface such that the user interface will not interfere with the user's use of the interactive touch screen display device 110. For example, as a user is working within a primary input location zone 1250, a user interface 1210 that encroaches the primary input location zone 1250 may interfere with the user's use of the computing functionality provided by the interactive touch screen display device 110 (e.g., writing on the touch surface 405 on a portion of the touch surface 405 that includes the user interface 1210. In some embodiments the system may be configured to translate a user interface 1210 away from a primary input location zone 1250 such that the user interface 1210 does not overlap or otherwise interfere with the primary input location zone 1250, but still remains accessible to a user working in the primary input location zone 1250.

Figure 16:
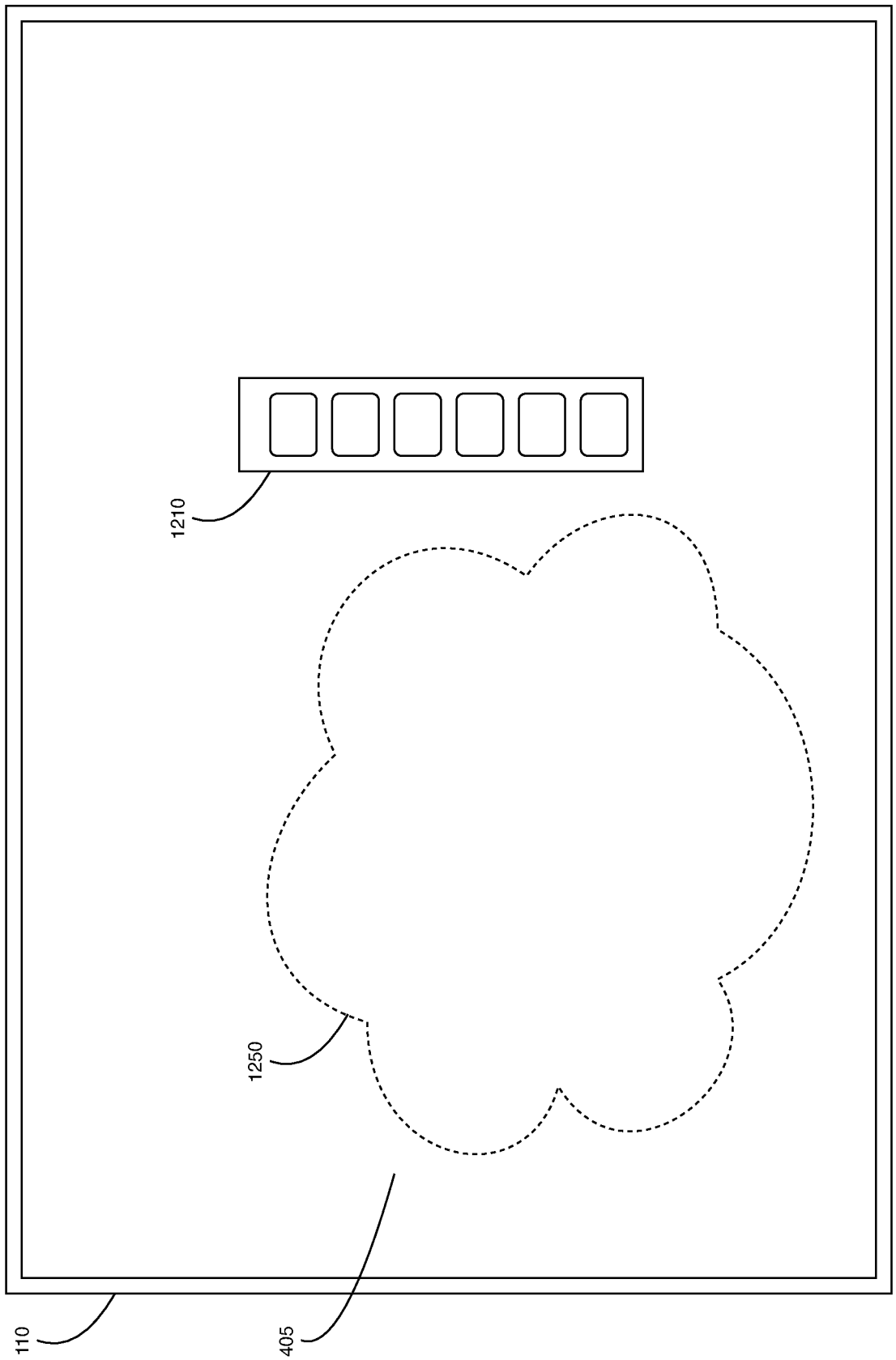

As shown in FIG. 15, the primary input location zone 1250 has expanded from the primary input location zone 1250 shown in FIG. 14. This may, for example, result from a user expanding the area in which they are working, etc. In response, the system may be configured to adjust the position of the user interface 1210 away from the primary input location zone 1250 such that the user interface 1210 no longer encroaches the current primary input location zone 1250 (e.g., to a position shown in FIG. 16).

Figure 17:
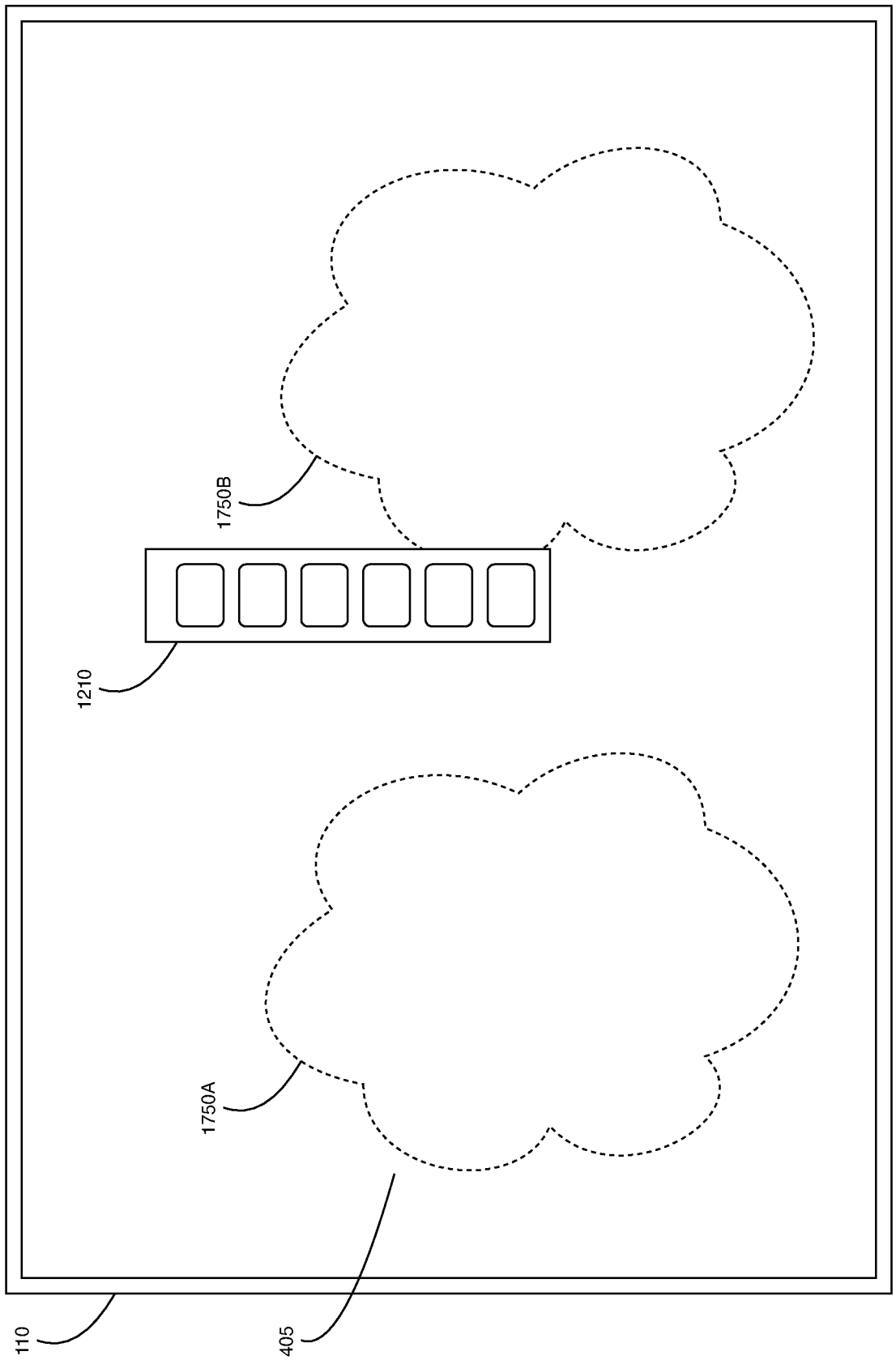
Figure 18:
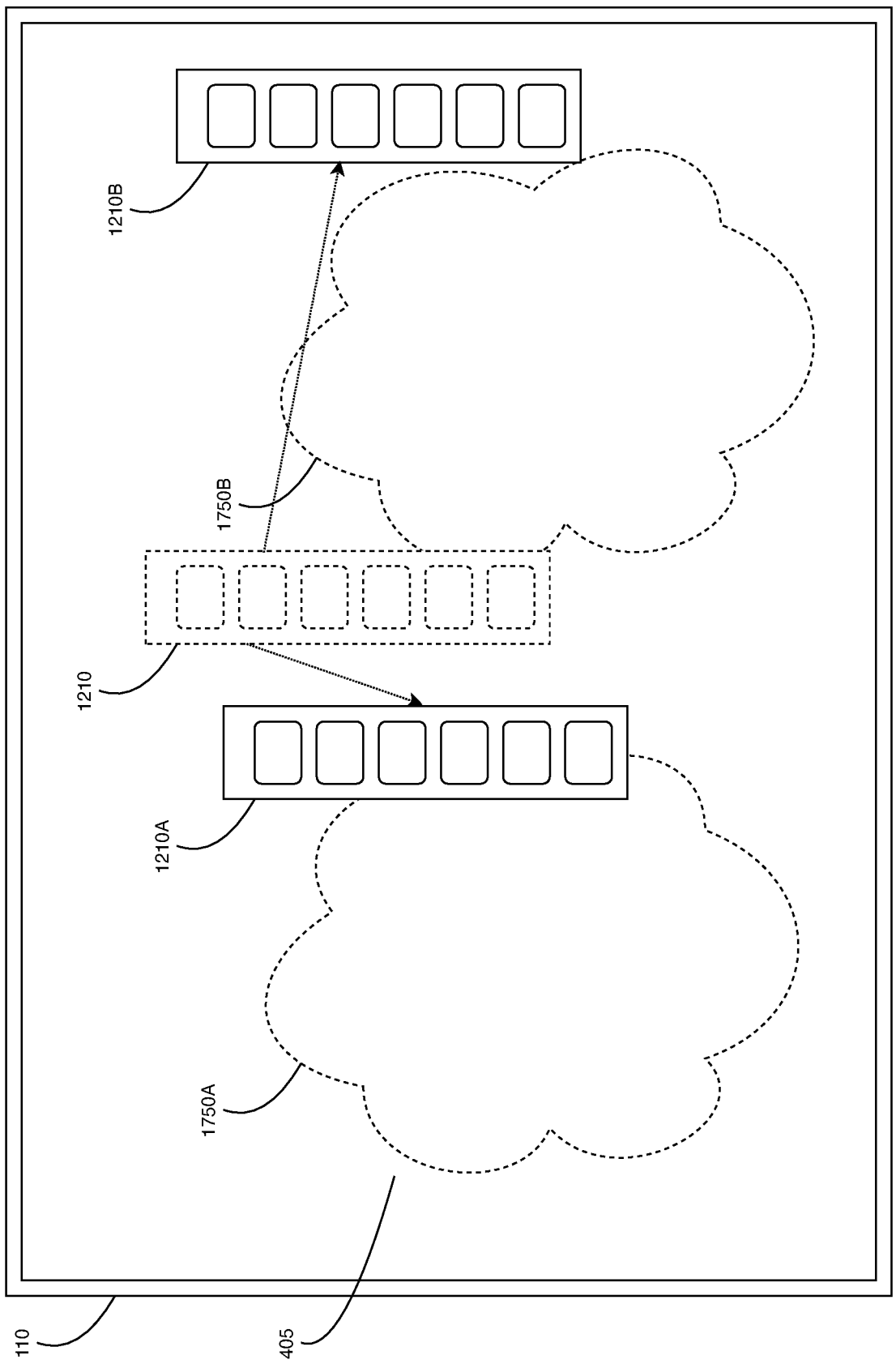

In some aspects, in which two users are simultaneously using the interactive display (e.g., working on different sides of the board), the system may be configured to duplicate a particular menu item or other interface element and translate each respective duplicate interface element toward each respective side of the display board. In this way, the menu or other interface element may be accessible to each user while each user is positioned on opposing sides of the display board. In such aspects, as shown in FIG. 17 and FIG. 18, the system may identify a primary input location zone 1750A and a secondary input location zone 1750B. The system may then duplicate the user interface 1210 such that there is a first user interface 1210A corresponding to the primary input location zone 1750A and a second user interface 1210B corresponding to the secondary input location zone 1750B. The system may then position each of the first and second user interfaces using any technique described herein.

CONCLUSION

Many modifications and other embodiments of the invention will come to mind to one skilled in the art to which this invention pertains having the benefit of the teachings presented in the foregoing descriptions and the associated drawings. While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, while some steps may be described as occurring in response to (e.g., or at least partially in response to) particular other steps, it should be understood that, in other embodiments, such steps may occur independent of (e.g., or coincident with) one another. In certain circumstances, multitasking and parallel processing may be advantageous. Moreover, the separation of various system components in the embodiments described above should not be understood as requiring such separation in all embodiments, and it should be understood that the described program components and systems may be generally integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. An interactive touch-enabled display device comprising a display device having at least one processor, a display screen, and an interactive touch screen display input, wherein the at least one processor is configured for:
receiving input location data from the interactive touch screen display input;
determining, based on the input location data, a position of an input location zone defining one or more user inputs on the interactive touch-enabled display device;
determining, based on the input location data, that the input location zone comprises a primary input location zone and a secondary input location zone;
determining, based on the input location zone, a relative position of the primary input location zone and a user interface displayed on the display screen;
in response to determining that the input location zone comprises the primary input location zone and the secondary input location zone, duplicating the user interface into a first duplicate user interface and a second duplicate user interface; and
modifying a position of the first duplicate user interface from an initial position to a second position disposed laterally between the initial position and the primary input location zone.

2. The interactive touch-enabled display device of claim 1, wherein the at least one processor is further configured for:
receiving additional input location data from the interactive touch screen display input;
determining that the additional input location data includes additional user inputs on the interactive touch-enabled display device within the primary input location zone; and
responsive to determining that the additional input location data includes the additional user inputs on the interactive touch-enabled display device within the primary input location zone, modifying the second position to a third position that is disposed laterally between the second position and the primary input location zone.

3. The interactive touch-enabled display device of claim 2, wherein the at least one processor is further configured for:
receiving second additional input location data from the interactive touch screen display input;
determining, based on the second additional input location data, that the second additional input location data includes an indication that at least a particular amount of time has passed from a latest user input on the interactive touch-enabled display device; and
responsive to determining that at least the particular amount of time has passed from the latest user input on the interactive touch-enabled display device, modifying the third position to a fourth position that is laterally disposed between the third position and the initial position.

4. The interactive touch-enabled display device of claim 2, wherein the at least one processor is further configured for:
receiving third additional input location data from the interactive touch screen display input;
determining, based on the third additional input location data, that the third additional input location data includes an indication that at least the particular amount of time has passed from the latest user input on the interactive touch-enabled display device; and
responsive to determining that at least the particular amount of time has passed from the latest user input on the interactive touch-enabled display device, modifying the third position to the initial position.

5. The interactive touch-enabled display device of claim 1, wherein:
the first duplicate user interface comprises a plurality of user interface elements; and
modifying the position of the first duplicate user interface comprises modifying a relative position of the plurality of user interface elements within the first duplicate user interface.

6. The interactive touch-enabled display device of claim 1, wherein modifying the relative position of the plurality of user interface elements within the first duplicate user interface comprises at least one of modifying an arrangement of at least one of the user interface elements of the plurality of user interface elements within the first duplicate user interface or modifying a lateral position of the at least one of the plurality of user interface elements within the first duplicate user interface.

7. The interactive touch-enabled display device of claim 1, wherein modifying the position of the first duplicate user interface from the initial position to the second position disposed laterally between the initial position and the primary input location zone comprises:
defining a user interface repositioning vector that extends between the first duplicate user interface and the primary input location zone; and
translating the first duplicate user interface along the user interface repositioning vector from the initial position to the second position that is disposed on the user interface repositioning vector.

8. The interactive touch-enabled display device of claim 1, wherein the at least one processor is further configured for:
positioning the first duplicate user interface adjacent the primary input location zone; and
positioning the second duplicate user interface adjacent the secondary input location zone.

9. An interactive touch screen display device comprising a display device having at least one processor, a display screen, and an interactive touch screen display input, wherein the at least one processor is configured for:
receiving input data via the interactive touch screen display input;
determining a relative position of one or more inputs on the interactive touch screen display input defined by the input data with respect to a first position of at least one interface element on the display screen;
determining that the one or more inputs comprise:
a first set of inputs in a primary input location zone in a second position relative to the first position;
a second set of inputs in a secondary input location zone in a third position relative to the first position;
configuring, based on the input data, a first user interface that includes a modified lateral position of the at least one interface element on the display screen by adjusting the lateral position of the at least one interface element toward the second position relative to the first position of the at least one interface element;

duplicating the at least one interface element into a second user interface; and causing the interactive touch screen display to display the second user interface and the first user interface including the modified lateral position of the at least one interface element on the display screen.

10. The interactive touch screen display device of claim 9, wherein:
the at least one interface element is a first interface element of a plurality of interface elements; and
each of the plurality of interface elements are disposed in a line that is parallel to an upper and lower edge of the interactive touch screen display device.

11. The interactive touch screen display device of claim 10, wherein the first position is a center point of the interactive touch screen display device.

12. The interactive touch screen display device of claim 11, wherein the input data comprises one or more user inputs on a menu defined by the plurality of interface elements.

13. The interactive touch screen display device of claim 12, wherein:
the menu comprises the plurality of interface elements;
the menu extends from a left edge of the interactive touch screen display device to a right edge of the interactive touch screen display device; and
the plurality of interface elements are distributed in the line such that the plurality of interface elements extend across a portion of the menu.

14. The interactive touch screen display device of claim 13, wherein the input data comprises one or more user inputs on the menu on a portion of the menu that do not include the plurality of interface elements.

15. The interactive touch screen display device of claim 9, wherein:
determining the relative position of the one or more inputs on the interactive touch screen display input defined by the input data with respect to the first position of the at least one interface element on the display screen comprises determining that at least a threshold number of the one or more inputs occurred in a vertical segment of the display screen; and
configuring the first user interface based on the input data comprises biasing the at least one interface element from the first position to a fourth positioned defined by the vertical segment of the display screen based on the threshold number of the one or more inputs.

16. The interactive touch screen display device of claim 9, wherein the at least one processor is further configured for:
determining a lateral location of a user of the interactive touch screen display device relative to the interactive touch screen display device; and
adjusting the modified lateral position based on the lateral location of the user.

17. The interactive touch screen display device of claim 16, wherein the at least one processor is further configured for:
accessing profile data for the user;
determining a dominant hand of the user from the profile data; and
adjusting the modified lateral position based on the dominant hand.

18. A method comprising: receiving, by computing hardware, input location data received via an interactive touch-enabled display device; defining, by the computing hardware, a primary input location zone and a secondary input location zone that is spaced apart from the primary input location zone on the interactive touch-enabled display device based on the input location data; identifying, by the computing hardware, a user interface displayed on the interactive touch-enabled display device in a first position; duplicating the user interface into a first user interface and a second user interface; and modifying, by the computing hardware, the first position of the first user interface to a second position that is disposed between the first position and the primary input location zone.

19. The method of claim 18, further comprising:
receiving, by the computing hardware, additional input location data;
determining, by the computing hardware based on the additional input location data, that the additional input location data includes additional user inputs on the interactive touch-enabled display device within the primary input location zone; and
responsive to determining that the additional input location data includes the additional user inputs on the interactive touch-enabled display device within the primary input location zone, modifying, by the computing hardware, the second position to a third position that is disposed between the second position and the primary input location zone.

20. The method of claim 19, further comprising:
receiving, by the computing hardware, second additional input location data;
determining, by the computing hardware based on the second additional input location data, that the second additional input location data includes an indication that at least a particular amount of time has passed from a latest user input on the interactive touch-enabled display device; and
responsive to determining that at least the particular amount of time has passed from the latest user input on the interactive touch-enabled display device, modifying, by the computing hardware, the third position to a fourth position that is disposed between the third position and the first position.

* * * * *